United States Patent
Goto et al.

[11] Patent Number: 5,260,732
[45] Date of Patent: Nov. 9, 1993

[54] CAMERA FOR PRODUCING A PHOTOGRAPHING FIELD ANGLE INFORMATION AND A PRINTER FOR PRINTING ON THE BASIS OF PHOTOGRAPHING FIELD ANGLE INFORMATION

[75] Inventors: Tetsuro Goto, Funabashi; Kazuyuki Kazami, Tokyo; Toshio Sosa, Narashino; Koichi Daitoku, Sagamihara; Akira Ezawa, Shin, all of Japan

[73] Assignee: Nikon Corporation, Tokyo, Japan

[21] Appl. No.: 913,783

[22] Filed: Jun. 30, 1992

Related U.S. Application Data

[63] Continuation of Ser. No. 799,875, Nov. 27, 1991, abandoned, which is a continuation of Ser. No. 535,148, Jun. 8, 1990, abandoned.

[30] Foreign Application Priority Data

Jun. 15, 1989 [JP] Japan ............................ 1-153116
Jul. 7, 1989 [JP] Japan ............................ 1-175959
Jul. 11, 1989 [JP] Japan ............................ 1-177013

[51] Int. Cl.$^5$ ............................................. G03B 17/24
[52] U.S. Cl. ............................... 354/105; 354/149.1; 354/195.1
[58] Field of Search ............... 354/105, 106, 149.1, 354/195.1, 195.12, 286, 75, 76

[56] References Cited

U.S. PATENT DOCUMENTS

| Re. 32,797 | 12/1988 | Harvey | 354/106 X |
| 4,515,453 | 5/1985 | Wakabayashi et al. | 354/149.1 |
| 4,678,299 | 7/1987 | Harvey | 354/21 |
| 4,780,735 | 10/1988 | Taniguchi et al. | 354/202 |

FOREIGN PATENT DOCUMENTS

54-26721 2/1979 Japan .

*Primary Examiner*—David M. Gray
*Attorney, Agent, or Firm*—Shapiro and Shapiro

[57] ABSTRACT

A camera capable of photographing with the aid of the application of light to an object to be photographed by electrical flash means includes producing means for producing field angle information regarding the photographing field angle, detecting means for detecting that the photographing field angle is wider than the illuminating angle of the light of the electrical flash means and outputting a detection signal, and control means responsive to the detection signal to cause the producing means to produce field angle information indicative of a photographing field angle narrower than the illuminating angle of the light of the electrical flash means.

29 Claims, 20 Drawing Sheets

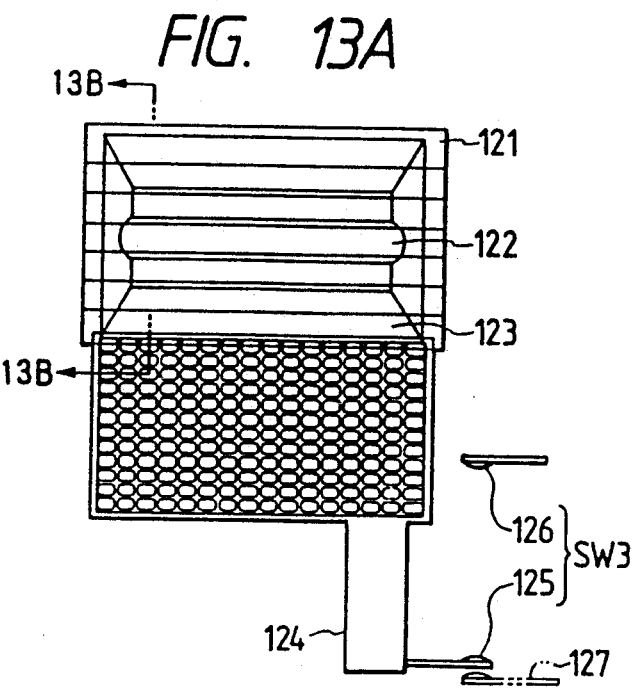
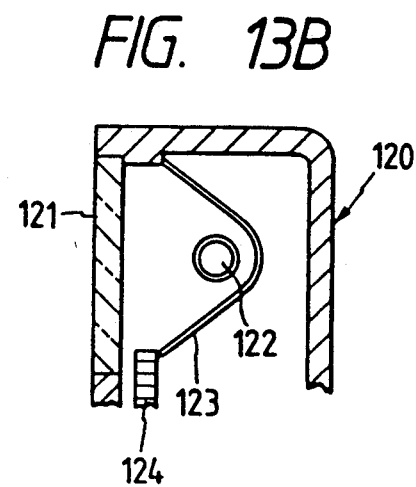
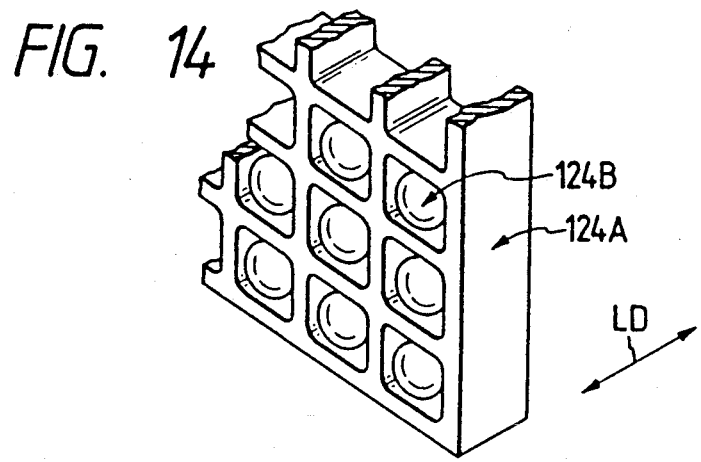
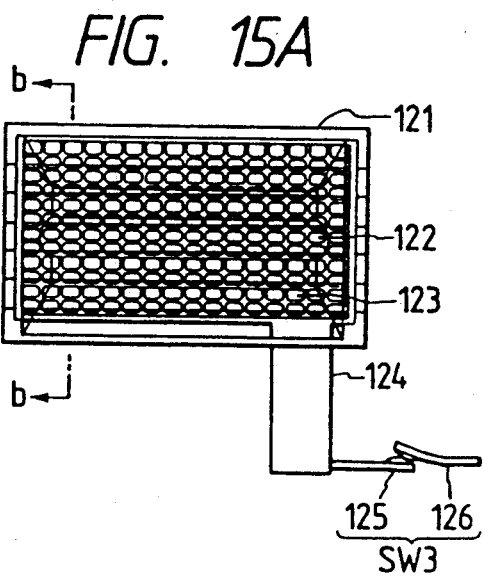
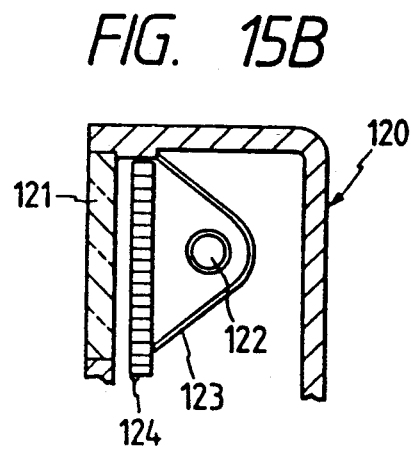

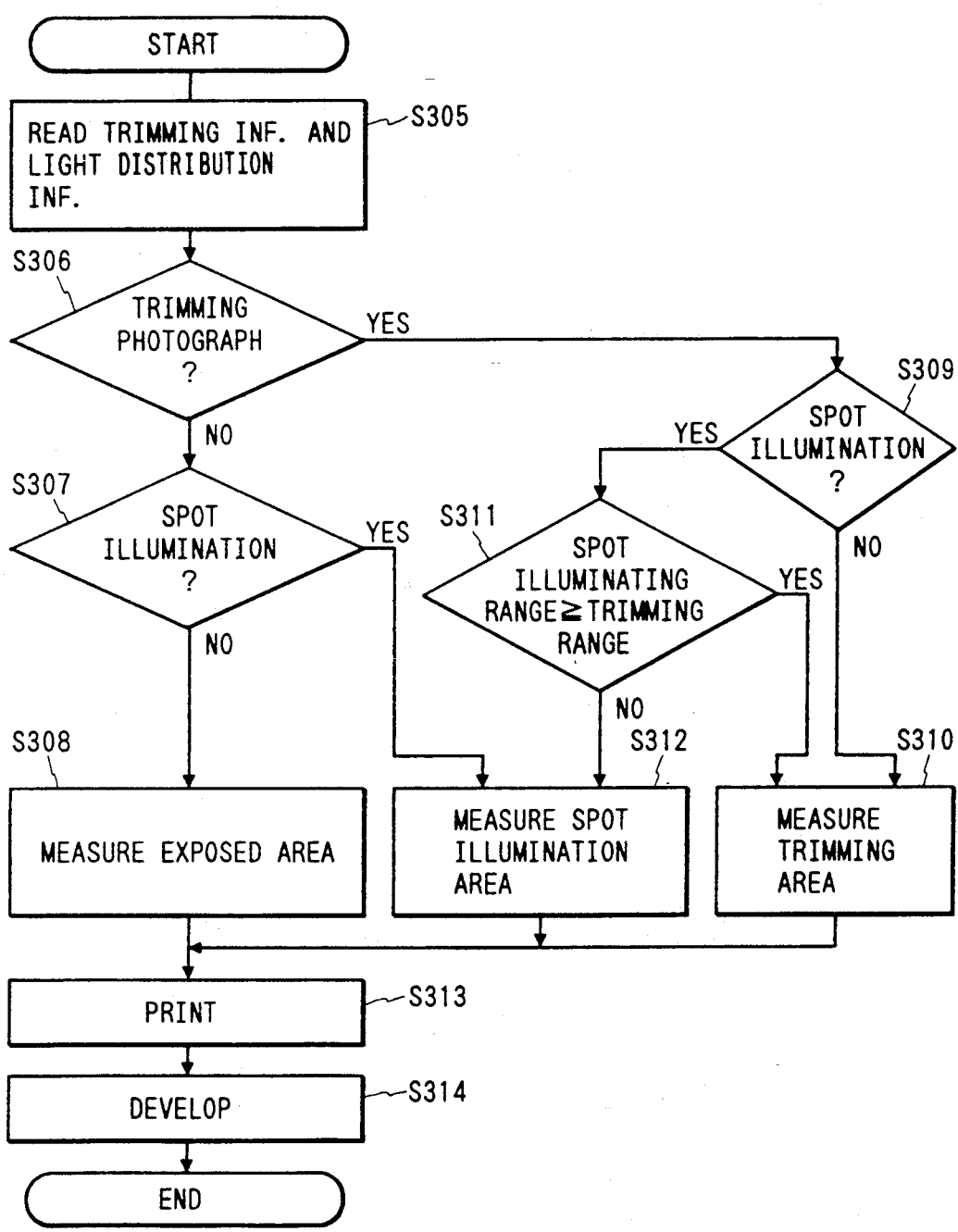

CAMERA FOR PRODUCING A PHOTOGRAPHING FIELD ANGLE INFORMATION AND A PRINTER FOR PRINTING ON THE BASIS OF PHOTOGRAPHING FIELD ANGLE INFORMATION

This is a continuation of application Ser. No. 799,875 filed Nov. 27, 1991, which is a continuation of application Ser. No. 535,148 filed Jun. 8, 1990, both of which are now abandoned.

BACKGROUND OF THE INVENTION

1. Field of the Invention

This invention relates to a camera for controlling its own photographing condition on the basis of photographing field angle information and a printer for developing film exposed by the camera.

2. Related Background Art

There has been a camera in which the focal length of a zoom lens is changed by a motor or the like to thereby adjust the photographing field angle.

Further, there have been proposed various cameras in which trimming magnification for designating the area of an exposure area corresponding to one frame on film which is to be printed, i.e., the area to be trimmed, can be recorded, for example, on a predetermined area of the film during photographing. U.S. Pat. Nos. 4,678,299 and 4,780,735 have proposed cameras of this kind. The recorded trimming magnification is read on a printer side during printing, and only a predetermined portion of the exposure area on the film is enlarged and output in conformity with the read trimming magnification. Accordingly, by changing this trimming magnification during the exposure of each frame, photographs of various field angles can be obtained even if the photo-taking lens is a single focus lens.

SUMMARY OF THE INVENTION

It is the object of the present invention to provide a camera for appropriately controlling its own photographing condition on the basis of photographing field angle information concerned with both of the focal length and the trimming magnification of a photo-taking lens, and a printer associated with the camera.

BRIEF DESCRIPTION OF THE DRAWINGS

FIGS. 13A, 13B, 14, 15A and 15B show the construction of an electronic flash device in the second embodiment of the present invention.

FIGS. 18A and 18B are flow charts showing the operation of the modification of the second embodiment of the present invention.

DESCRIPTION OF THE PREFERRED EMBODIMENTS

The principle of a first embodiment of the present invention will now be described. When photographing is effected by the use of a camera in which the zooming or trimming of a photo-taking lens is possible and an electrical flash device, if the photographing field angle A is greater than the illuminating angle B of the electrical flash device 30 as shown, for example, in FIG. 1, the entire photographing field angle will not be illuminated and illumination irregularity will occur.

Figure 1:
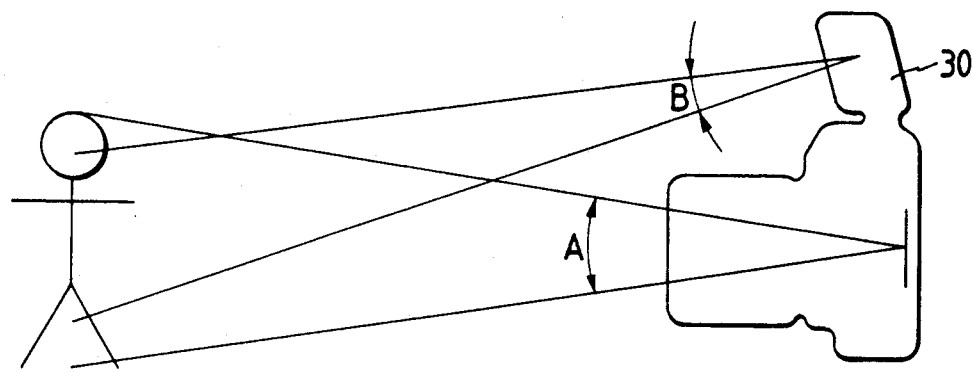
FIGS. 1 and 2 illustrate the principle of a first embodiment of the present invention.
Figure 2:
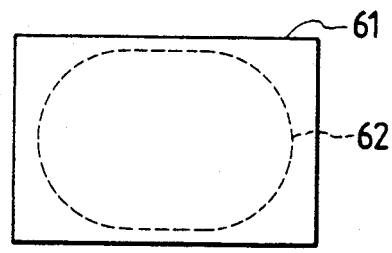

FIG. 2 shows this phenomenon on the surface of film, and the reference numeral 61 designates an exposure area, and the reference numeral 62 denotes the illuminating range of the electrical flash device. As can be seen from this figure, the illuminating light is not applied to the upper and lower portions and left and right portions of the exposure area 61 and therefore, the printed photograph is dark in the marginal portion thereof. Particularly in a case where the object to be photographed is a figure as shown in FIG. 1, the head and feet of the figure will be dark and unnatural in the resultant photograph.

Such a phenomenon can be prevented if use is made of an electrical flash device whose illuminating angle is variable over a wide range, but the above-mentioned illumination irregularity cannot be prevented when photographing is effected at a wide photographing field angle by the use of an electrical flash device whose illuminating angle is variable over a narrow range or whose illuminating angle is constant.

Figure 3:
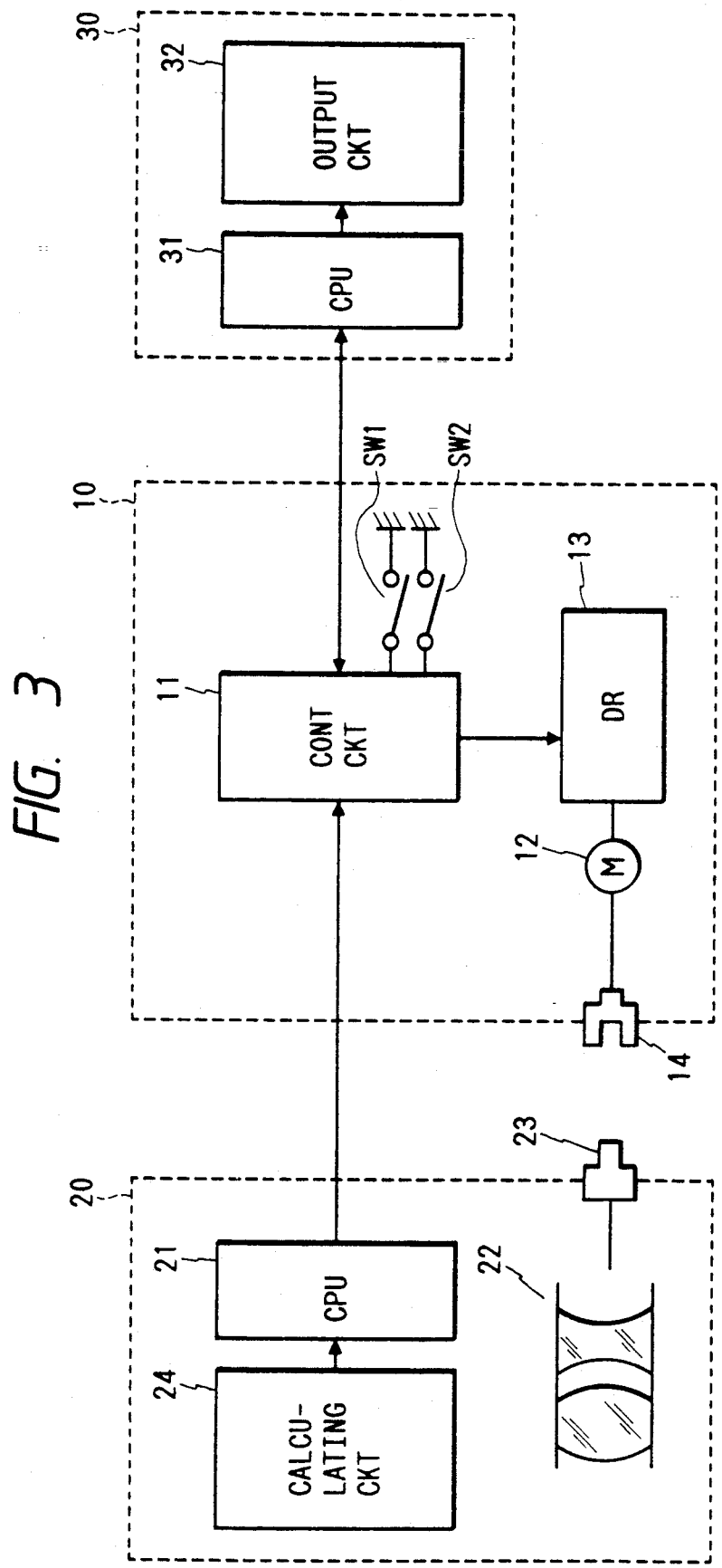
FIG. 3 is a block diagram of the first embodiment of the present invention.

Referring to FIG. 3 which shows the general construction of the first embodiment of the present invention, a lens barrel 20 and an electrical flash device 30 are mountable on a camera body 10. A motor driving circuit 13 for a zoom motor 12 is connected to a control circuit 11 provided in the camera body 10, and a coupling 14 is connected to the output shaft of the motor 12. When the lens barrel 20 is mounted on the camera body, a CPU 21 in the lens barrel 20 is connected to the control circuit 11 and a coupling 23 connected to a photo-taking lens (zoom lens) 22 is engaged with the coupling 14.

Zooming switches SW1 and SW2 adapted to be closed in response to the operation of a zooming button are also connected to the control circuit 11. The control circuit 11 drives the motor 12 through the motor driving circuit 13 to change the focal length (field angle information) of the photo-taking lens 22 toward the telephoto side as long as the switch SW1 is closed. The rotation of the motor 12 is transmitted to the photo-taking lens 22 through the couplings 14 and 23 and a gear train, not shown, whereby the focal length of the photo-taking lens 22 is continuously varied toward the telephoto side. That is, a predetermined focal length is set by zoom up. Also, as long as the switch SW2 is closed, the focal length of the photo-taking lens 22 is likewise continuously varied toward the wide angle side by the motor 12 through the motor driving circuit 13. That is, a predetermined focal length is set by zoom down.

A field angle information output circuit 24 is connected to the CPU 21 in the lens barrel 20, and this field angle information calculating circuit 24 detects the focal length of the photo-taking lens 22 and calculates a lens field angle conforming to that focal length. Here, this lens field angle corresponds to the photographing field angle, which becomes narrower as the focal length is longer.

The photographing field angle thus determined is input to the control circuit 11 of the camera body 10 side through the CPU 21.

When the electronic flash device 30 is mounted on the camera body 10, the control circuit 11 and the CPU 31 of the electronic flash device 30 side are connected together. An illuminating angle information output circuit 32 which outputs the illuminating angle of a light emitting tube (not shown) housed in the device 30 is connected to the CPU 31, and this illuminating angle is input to the control circuit 11 of the camera body 10 side through the CPU 31. Here, it is to be understood that the illuminating angle of the electrical flash device 30 is constant.

The procedure of the control by the control circuit 11 of the camera body 10 side will now be described with reference to the flow charts of FIGS. 4 and 5.

Figure 4:
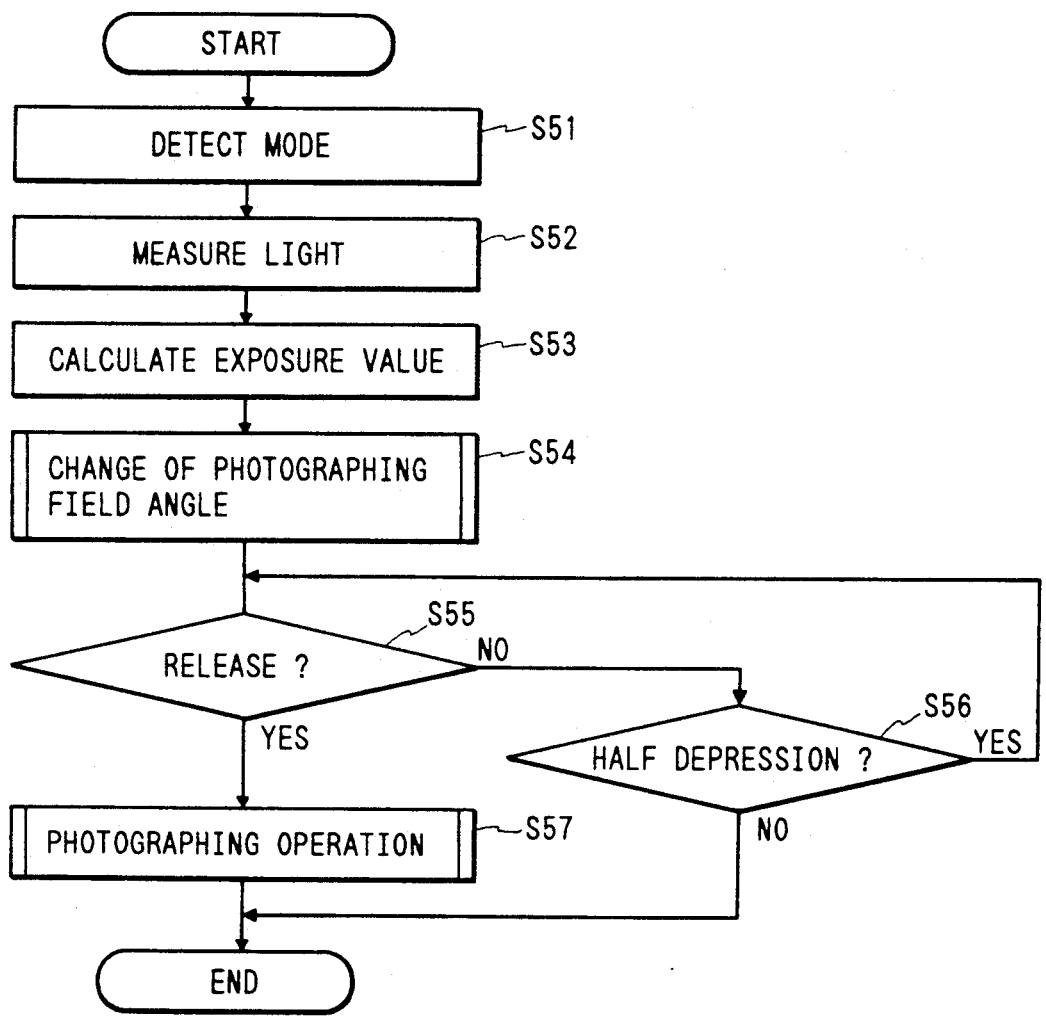
FIGS. 4 and 5 are flow charts showing the operation of the first embodiment of the present invention.

When a release button is half-depressed, the program of FIG. 4 is started and first, at a step S51, detection of mode is effected. That is, which of various exposure modes (such as the shutter priority mode and the aperture priority mode) is set is judged. Then, at a step S52, a light measuring device, not shown, is operated to measure light, and at a step S53, an exposure value (an aperture value and a shutter speed) is calculated on the basis of the result of the measurement of light and the set exposure mode, and advance is made to a step S54.

At the step S54, a change of the photographing field angle is effected on the basis of the illuminating angle of the electronic flash device 30 and the photographing field angle (lens field angle) conforming to the focal length of the photo-taking lens 22. The details of this step S54 are shown in FIG. 5.

Figure 5:
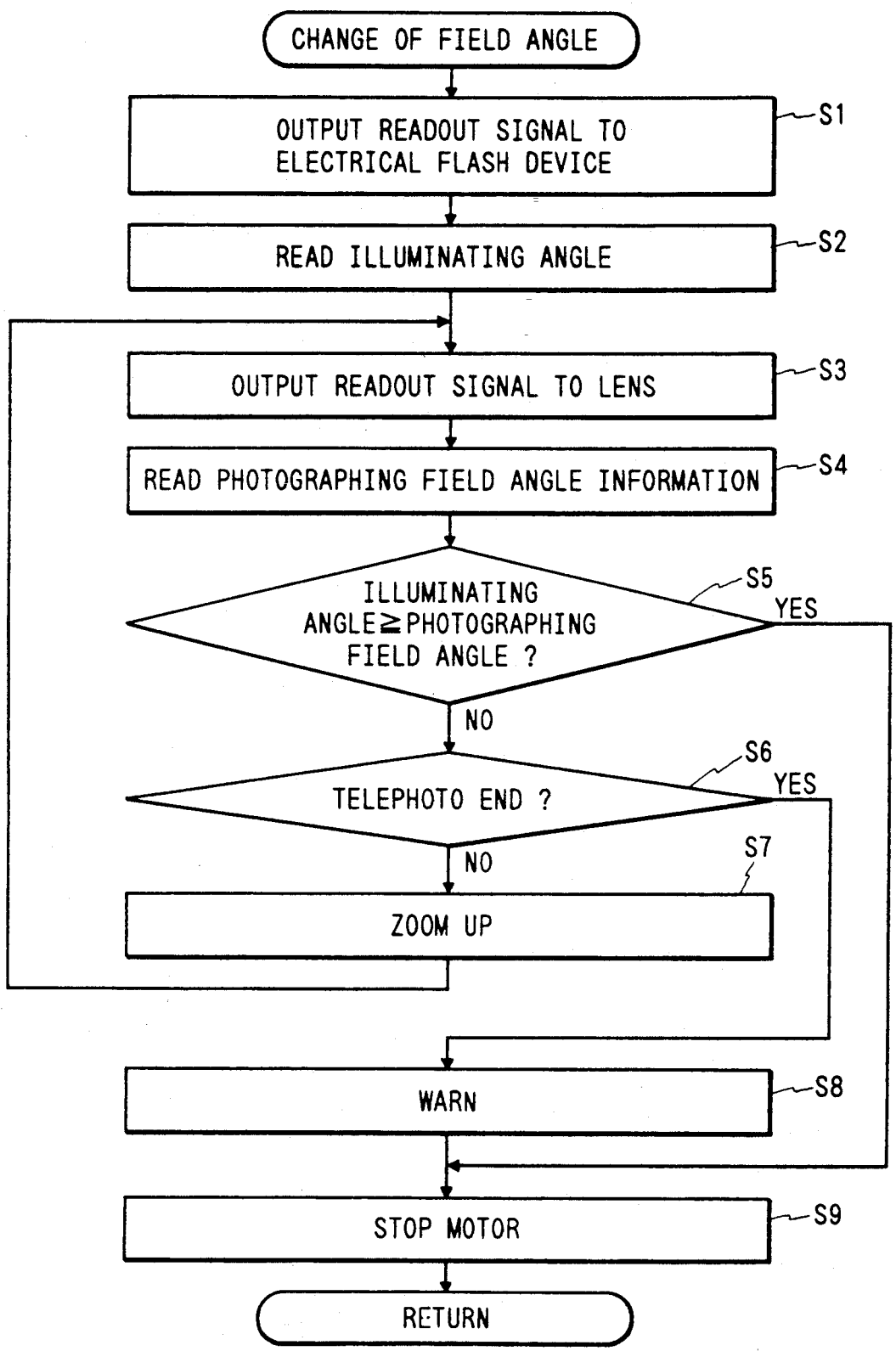

In FIG. 5, first at a step S1, a readout signal is output to the CPU 31 of the electrical flash device 30 and at a step S2, the illuminating angle of the light emitting tube is input. That is, the illuminating angle input from the illuminating angle information output circuit 32 to the CPU 31 is read. Then, at a step S3, communication with the CPU 21 of the lens barrel 20 is effected and at step S4, the photographing field angle is input, and advance is made to a step S5. That is, the field angle information calculating circuit 24 reads the field angle input to the CPU 21.

At the step S5, whether the illuminating angle is equal to or greater than the photographing field angle is judged. If the determination is affirmative, advance is made to a step S9, where the zoom motor 12 is stopped, and advance is made to the step S55 of FIG. 4. If the determination is negative, that is, if the photographing field angle is wider than the illuminating angle, a field angle changing signal is output and advance is made to a step S6.

At the step S6, whether the photo-taking lens 22 is at the telephoto end, that is, whether any further zoom up is impossible, is judged. If the determination step S6 is negative, advance is made to a step S7, where the focal length of the photo-taking lens 22 is driven toward the telephoto side by the motor 12 through the motor driving circuit 13. Thereby, the photographing field angle becomes narrower. Thereafter, the process returns to the step S3, and the above-described process is repeated.

Also, if at the step S6, the photo-taking lens 22 is judged to be at the telephoto end, at a step S8, a warning to the effect that no further zoom up can be effected (the field angle cannot be made narrower) is given, for example, through a liquid crystal display device (not shown). Then, at a step S9, the motor 12 is stopped and advance is made to the step S55 of FIG. 4. If the above-mentioned warning is output, it is necessary to interchange the lens barrel with one in which a longer focal length can be set, that is, which can make the photographing field angle narrower, or to exchange the electrical flash device with one of a wider illuminating angle.

At the step S55, whether the release button has been fully depressed is judged, and if the decision is negative, at a step S56, whether the half depressing operation is released is judged. If the decision at step S56 is negative, the process is terminated, and if the decision is affirmative, return is made to the step S55. If the step S55 decision is affirmative, at a step S57, the photographing process is carried out and terminated.

Figure 6:
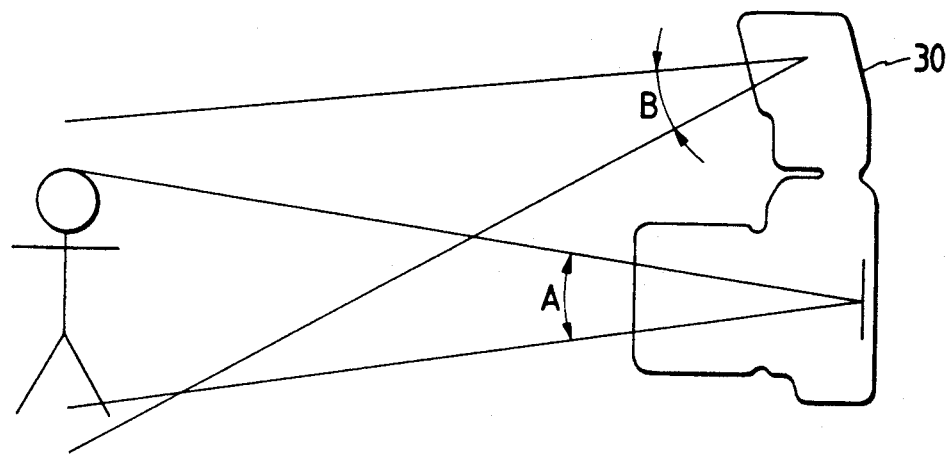
FIGS. 6 and 7 show the effect of the first embodiment.
Figure 7:
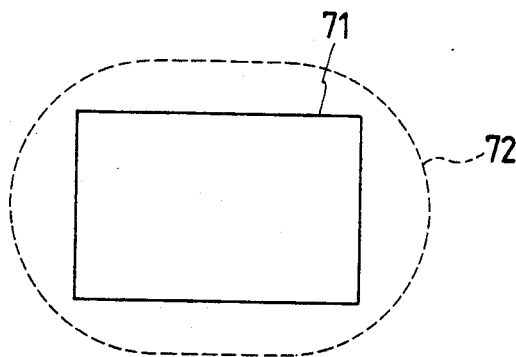

According to the above-described procedure, when the photographing field angle conforming to the focal length of the photo-taking lens selectively set by the operation of the switches SW1 and SW2 is wider than the illuminating angle of the electrical flash device 30, the zoom up of the photo-taking lens 22 is automatically effected with the half depression of the release button, and as shown, for example, in FIG. 6, the photographing field angle A becomes narrower than the illuminating angle B. Accordingly, as shown in FIG. 7, the whole of the exposure area 71 of the film is included in the illuminating range 72 of the electrical flash device and illumination irregularity can be prevented.

In the construction of the above-described embodiment, the CPU 11, the motor driving circuit 13 and the zoom motor 12 together constitute setting means, and the CPU 11 constitutes signal output means.

In the foregoing, description has been made of a case where a zoom lens is used, but the present invention can also be applied to a case where use is made of a multifocus lens in which a plurality of focal lengths are stepwisely changeable.

A modification of the first embodiment of the present invention will now be described with reference to FIGS. 8 to 10.

Figure 8:
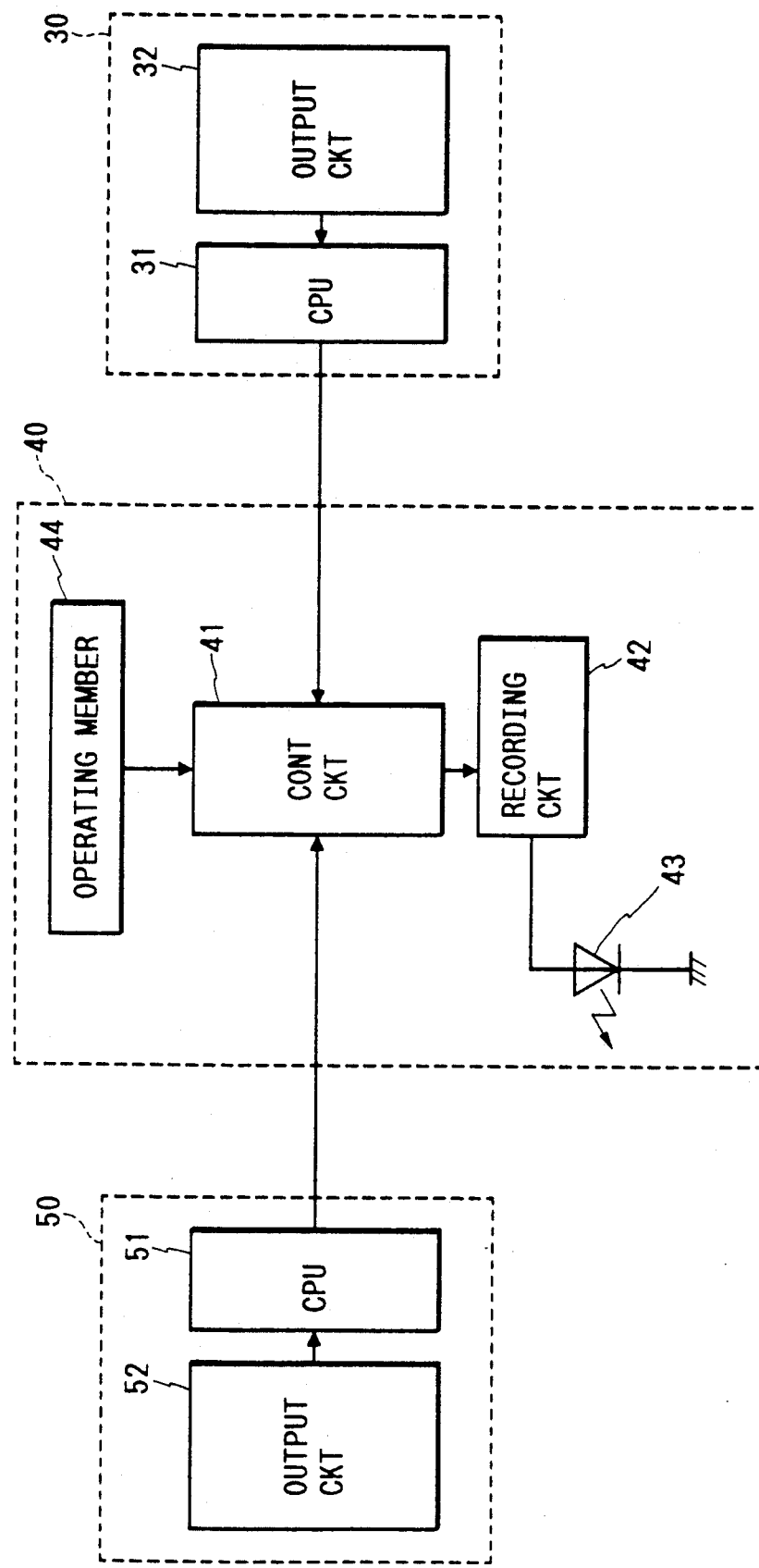
FIG. 8 is a block diagram of a modification of the first embodiment of the present invention.

Referring to FIG. 8, a lens barrel 50 and the above-described electrical flash device 30 are made mountable on a camera body 40. A recording circuit 42 is connected to a control circuit 41 provided in the camera body 40, and an LED 43 is connected to the recording circuit 42. The LED 43 is for imprinting the trimming magnification (field angle information) into a predetermined area of the film during the exposure of each frame.

Here, the trimming magnification, as described above, shows the area of the exposure area corresponding to one frame of the film in which printing is enlargedly effected, i.e., the area to be trimmed, and this trimming magnification multiplied by the focal length of the photo-taking lens is a value corresponding to the focal length. When, for example, the focal length of the photo-taking lens is 35 mm and the trimming magnification is "2", the value corresponding to the focal length is 70 mm and thus, there will be obtained a photograph of the same field angle as that when photographing is effected by the use of a photo-taking lens having a focal length of 70 mm. In the camera of this embodiment, a plurality of trimming magnifications are selectively settable by the operation of an operating member 44 constructed as a dial or a button.

The control circuit 41 sets a predetermined trimming magnification with the operation of this operating member and also causes a field frame conforming to the set trimming magnification to be displayed within a viewfinder, not shown. It outputs a recording signal for recording the set trimming magnification to the aforementioned recording circuit 42 during photographing.

In the lens barrel 50, there are provided a CPU 51, a field angle information output circuit 52 for outputting the focal length of a photo-taking lens, and the photo-taking lens (not shown) is a single-focus lens of a predetermined focal length.

The process performed by the control circuit 41 will now be described.

When a desired trimming magnification is set by the operation of the operating member and then the release button is half-depressed, the program of FIG. 4 is started and after the processing of the above-described steps S51–S53, advance is made to a step S54.

Figure 9:
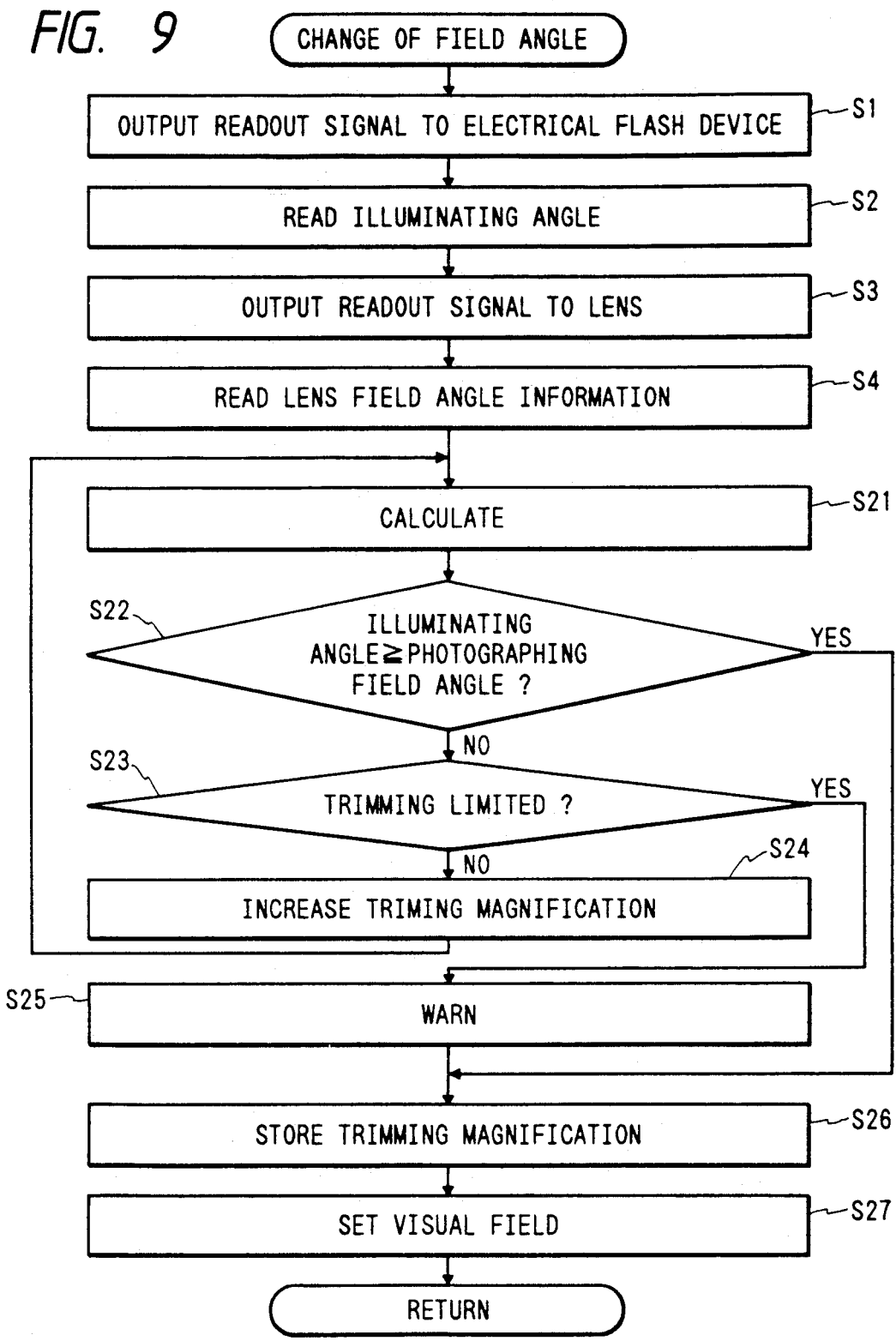
FIG. 9 is a flow chart showing the operation of the modification of the first embodiment of the present invention.
Figure 10:
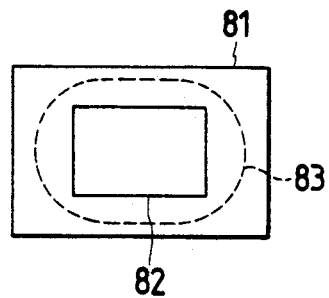
FIG. 10 shows the effect of the modification of the first embodiment of the present invention.

FIG. 9 shows the details of the step S54 in the present embodiment, i.e., the process procedure of changing the field angle. First, the process of the steps S1–S4 (already described in connection with FIG. 5) is carried out, and then at a step S21, the photographing field angle is calculated from the currently set trimming magnification and the input lens field angle of the photo-taking lens. In the first embodiment, the lens field angle itself corresponds to the photographing field angle, whereas in the present embodiment, the field angle when trimming is effected for this lens field angle is the photographing field angle. That is, for the same lens field angle, the greater the trimming magnification, the narrower the photographing field angle.

Advance is then made to a step S22, where whether the illuminating angle is equal to or greater than the calculated photographing field angle is judged. If the decision is affirmative, advance is made to a step S26, where the set trimming magnification is stored, and at a step S27, a field frame conforming to this trimming magnification is formed in the viewfinder and advance is made to the step S55 of FIG. 4. If the step S22 decision is negative, that is, if the photographing field angle is wider than the illuminating angle, a field angle changing signal is output and advance is made to a step S23.

At the step S23, whether trimming has reached its limit, that is, whether setting of any greater trimming magnification is impossible, is judged. If the step S23 decision is negative, advance is made to a step S24, where the trimming magnification is changed and set to a value greater by one step and return is made to the step S21, and the above-described process is repeated.

Also, if at the step S23, it is judged that trimming has reached its limit, at a step S25, a warning to the effect that the photographing field angle cannot be made narrower is given through a liquid crystal display device, whereafter via steps S26 and S27, advance is made to the step S55 of FIG. 4.

Thereafter, the photographing process (a step S57) is carried out by the full depression of the release button, and at this time, the trimming magnification recorded at the step S26 is imprinted into a predetermined area of the film by the LED 43 through the recording circuit 42. This imprinted trimming magnification is read on the printing apparatus side during printing, and in conformity with this trimming magnification, only a predetermined portion of the exposure area of the film is enlarged and printed.

If at the step S23, it is judged that trimming has reached its limit, data to the effect that the illuminating angle of the electrical flash device 30 has been deficient may also be recorded when the trimming magnification is recorded on the film. If that effect is described on the output print, it will be readily seen that the unsatisfactory finish is due to the photographer himself.

Thus, when the photographing field angle calculated from the lens field angle of the photo-taking lens and the trimming magnification is wider than the illuminating angle of the electrical flash device 30, the trimming magnification is automatically changed to a greater value with the half depression of the release button and the photographing field angle becomes narrower than the illuminating angle. Accordingly, as shown in FIG. 10, the area 82 to be trimmed in the whole of the exposure area 81 of one frame on the film is included in the illuminating range 83 of the electrical flash device and illumination irregularity can be prevented.

In the foregoing, description has been made that the trimming magnification is optically imprinted into a predetermined area on the film, but this is merely exemplary. For example, the trimming magnification may be electrically recorded on a memory provided on a film magazine. Further, the time when the trimming magnification is recorded is not limited to the time of photographing, and the recording may be effected in batch, for example, when the exposure of all frames is completed.

Also, in a camera wherein zooming of a photo-taking lens and trimming are both possible, one of them may be selected in accordance with whether the mounted photo-taking lens is a single-focus lens or a zoom lens. Further, in such a camera, if for example, at the step S6 of FIG. 5, the telephoto end is judged, advance may be made to the step S21 of FIG. 9, where the field angle may be narrowed by trimming.

The principle of a second embodiment of the present invention will now be described. The second embodiment of the present invention is concerned with spot illumination by an electrical flash device. Photographing under the spot illumination by the electrical flash device is such that the central portion of the photographing picture plane is preponderantly illuminated and under-illumination is effected toward the marginal portion whereby a figure is depicted distinctly with a light such as a street light or candlelight to thereby accomplish an evocative picture in which the surroundings of the figure become gradually darker.

Figure 11A:
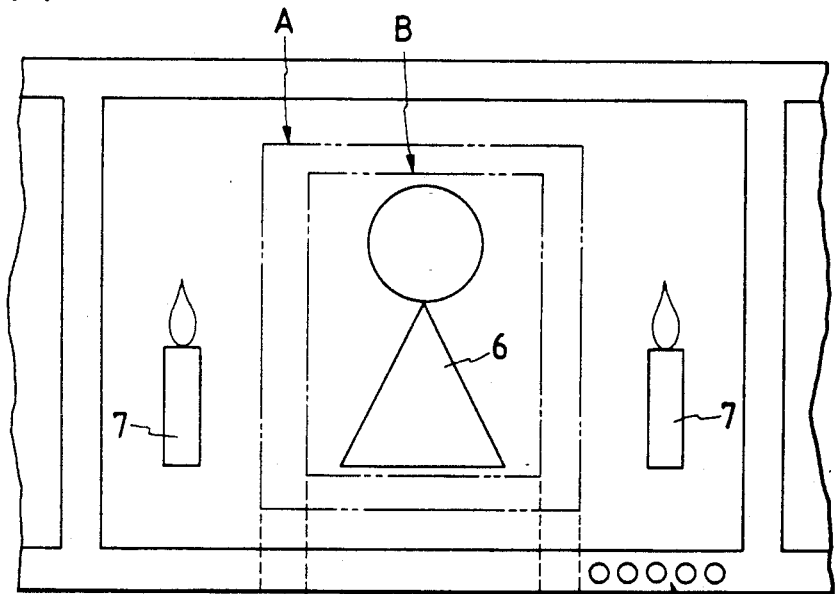
FIGS. 11A and 11B illustrate the principle of a second embodiment of the present invention.
Figure 11B:
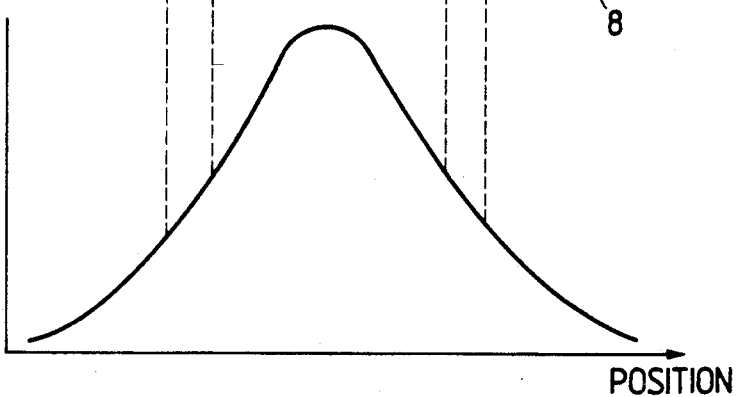

For example, when there are candles 7 on both sides of a FIG. 6 in the middle of a film frame shown in FIG. 11A, flashlight emission of such an illumination characteristic as shown in FIG. 11B is effected by spot illumination photography, whereby there can be taken a picture in which the flames of the candles 7 are in relief on both sides of the FIG. 6.

Also, in a camera capable of trimming photographing, when the trimming photographing mode is set, trimming information indicative of an area to be enlargedly printed during film printing is recorded as by imprinting on a frame portion or the like of a frame of photographing film in response to the photographing operation, and during the photograph printing after development, a trimming photograph can be automatically printed in accordance with trimming information read from the film on the printing apparatus side.

Further, for a camera capable of trimming photographing and a camera capable of spot illumination photographing, there is naturally conceivable a camera endowed with the both functions, and trimming photographing and spot illumination photographing can be suitably selected or used together by the photographer's operation.

A negative exposed in the spot illumination mode is such that the exposure amount of a stroboscopic lamp to the marginal portion of the picture plane is low relative to that to the central portion. Therefore, in the print making process by an ordinary autoprinter, the resultant print may sometimes be finished as a print of which the central portion is tinged with over-exposure contrary the photographer's intention.

Likewise, in the case of negative film exposed by the use of spot illumination photographing and trimming photographing at the same time, the resultant print may sometimes be a print of which the central portion is tinged with over-exposure. The problems just described occur because a negative density measuring device in the autoprinter measures the whole range of the negative and therefore measures the density of the entire negative low for spot-illuminated negative, with a result that an over-exposed print is obtained.

Figure 12A:
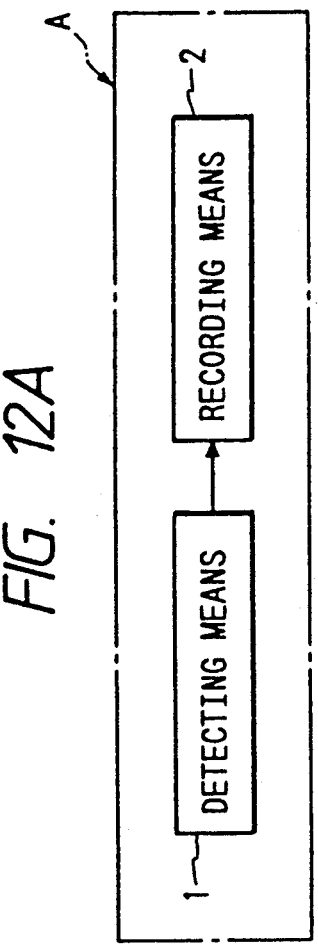
FIGS. 12A and 12B are block diagrams of the second embodiment of the present invention.
Figure 12B:
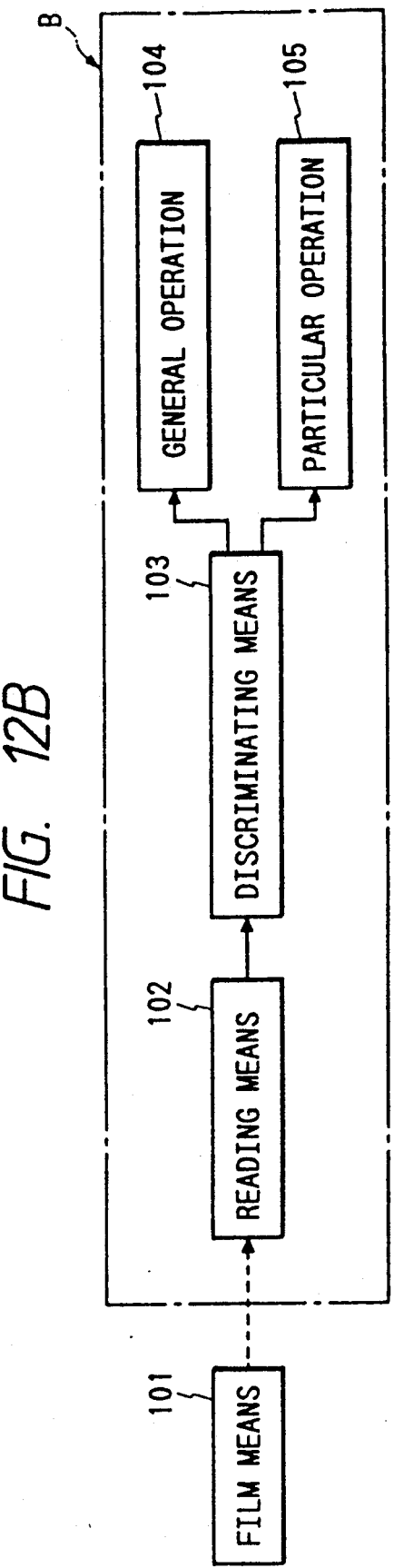

FIG. 12A shows the construction of a camera according to the second embodiment of the present invention, and FIG. 12B shows the construction of an autoprinter for effecting printing by the use of photographing information obtained by the camera of FIG. 12A.

Referring to FIG. 12A, the camera A is provided with light distribution characteristic detecting means 1 and light distribution information recording means 2.

The light distribution characteristic detecting means 1 detects the setting of the spot illumination photographing mode by spot illumination photographing means and produces a detection output of light distribution characteristic. That is, when the spot illumination photographing mode is set, the spot illumination photographing means effects flash photographing in which light is applied so that the center of the object field may be preponderantly illuminated and the quantity of illuminating light may decrease toward the marginal portion of the object field.

FIG. 13A shows a plan view of an electrical flash device for effecting spot illumination photographing, and FIG. 13B shows a cross-section thereof along line 13B—13B in FIG. 13A.

Referring to FIGS. 13A and 13B, a diffuser 121 is mounted on the front face of the electrical flash device body 120, and a light emitting tube 122 and a reflecting shade 123 for forwardly reflecting the emitted light from the light emitting tube 122 are provided within the electrical flash device body 120. A light distribution characteristic converting member 124 is vertically movably provided behind the diffuser 121, and the light distribution characteristic converting member 124 is of such structure as shown in more detail in FIG. 14.

That is, the light distribution characteristic converting member 124 is comprised of a grating 124A formed of a non-light transmitting material formed with a plurality of openings, and fly-eye lenses 124B provided in the openings in the grating 124A and formed of a transparent material. During ordinary photographing, it is lowered downwardly as shown in FIG. 13A, and during photographing by the spot illumination photographing mode, it is elevated upwardly as shown in FIGS. 15A and 15B and is positioned behind the diffuser 121.

The grating 124A of the light distribution characteristic converting member 124 is formed in a plane orthogonal to the optic axis of a light emitting portion comprised of the light emitting tube 122 and the reflecting shade 123, and substantially all the quantity of the emitted light near the optic axis of the light emitting tube 122 rectilinearly travels through the openings in the grating 124A. The emitted light around the optic axis is intercepted by the grating 124A and thus, away from the optic axis, the light rectilinearly travelling through the grating 124A is decreased.

During ordinary photographing in which the light distribution characteristic converting member 124 is not inserted, as shown in FIGS. 13A and 13B, the illuminating light emitted from the light emitting tube 122 with the release operation is directly applied to the object to be photographed through the diffuser 121, and the then quantity of light relative to the field angle is substantially uniform over the entire field angle.

Also, during the ordinary photographing shown in FIGS. 13A and 13B, a contact member 125 provided on the lower protruding portion of the light distribution characteristic converting member 124 is in contact with a contact member 127 disposed below the contact member 125, and the contact members 125 and 127 together constitute a switch SW3 for detecting ordinary stroboscopic photographing. Thus, it can be detected by the ON signal of this switch SW3 that ordinary stroboscopic photographing is conducted.

Next, when as shown in FIGS. 15A and 15B, the light distribution characteristic converting member 124 is inserted between the light emitting tube 122 and the diffuser 121, there is obtained a spot illuminating state. Of the illuminating light emitted from the light emitting tube 122 with the release operation, substantially all of the light near the optic axis rectilinearly travels through the openings in the light distribution characteristic converting member 124 and the light in the area off the optic axis is partly prevented from rectilinearly travelling by the grating 124A. Therefore, away from the optic axis, the quantity of light reaching the object to be photographed decreases. Consequently, light is applied so that it may preponderantly illuminate the center of the so-called object field and so that toward the marginal portion, the quantity of illuminating light may decrease.

In the spot illumination photographing mode shown in FIGS. 15A and 15B, the contact member 125 provided on the light distribution characteristic converting member 124 side is in contact with a contact member 126 disposed above it, and the contact members 125 and 126 together constitute the switch SW3 for detecting the spot illumination photographing mode. The setting of the spot illumination photographing mode of the light distribution characteristic detecting means 1 shown in FIG. 12A can be detected by the ON signal of the switch SW3.

Referring again to FIG. 12A, the light distribution characteristic detecting means 1, as is apparent from what has been previously described, detects whether the photographing mode is the spot illumination photographing mode in which the center of the object field is preponderantly illuminated during photographing or the ordinary photographing mode in which the entire object field is uniformly illuminated. The detection output of the light distribution characteristic detecting means 1 is supplied to and recorded by light distribution information recording means 2. The light distribution information recording means 2 records the light distribution information on film or a film cartridge. This recording system may record the light distribution information as optical information on film, or may electrically record the light distribution information on a magnetic tape or a semiconductor memory provided in a film magazine.

The autoprinter of FIG. 12B will now be described.

Referring to FIG. 12B, the autoprinter B is provided with light distribution information reading means 102, printing condition discriminating means 103, general operation means 104 and particular operation means 105.

The light distribution information reading means 102 reads light distribution information optically recorded on film 101 or light distribution information electrically recorded on a magnetic tape or a semiconductor memory provided in the magazine of the film 101. Of course, the film 101 is film exposed by the camera A provided with the light distribution characteristic detecting means 1 and the light distribution information recording means 2 shown in FIG. 12A.

The printing condition discriminating means 103 instructs the particular operation means 105 to effect the printing process when it detects the set information of the spot illumination photographing mode from the information read by the light distribution information reading means 102. On the other hand, when it discriminates the set information of the ordinary flash photographing mode from the information read by the light distribution information reading means 102, it instructs the general operation means 104 to effect the printing process. The general operation means 104 is directed to the printing of negative illuminated so that the light distribution characteristic of a stroboscopic lamp during photographing may be uniform over the whole picture plane. Therefore, it measures the density and color tone on the whole picture surface of the negative and determines the quantity of printing light and the amount of color correction during printing on the basis of the measured values.

On the other hand, in the particular operation means 105, there is carried out the processing step of optimally printing the negative exposed during spot illumination in which the light distribution characteristic of the stroboscopic lamp during photographing preponderantly illuminates the center of the object field. If the density and color tone on the whole picture surface of the negative were measured in the same manner as in the general operation, the average density of the whole picture surface would be measured low and the quantity of printing light would be determined somewhat deficiently. That is, if the spot-illuminated negative is subjected to the general operation, the central portion of the picture surface is liable to be reproduced with a tinge of over-exposure on the print. Especially, as regards the spot-illuminated negative, it is often the case that the main object to be photographed usually lies near the center of the picture plane, so that the face of a figure would come out with a tinge of over-exposure. However, in the autoprinter B of the present invention, the processing by the particular operation means 105 is effected on the basis of discrimination by the printing condition discriminating means 103 that the light distribution characteristic is spot illumination. Accordingly, when measuring the density of the negative, only the spot-illuminated range is measured and the density value of the marginal portion of the picture surface is excluded, whereby the density of the negative can be accurately measured with regard to the spot-illuminated range and accurate printing conditions can be determined.

Figure 16A:
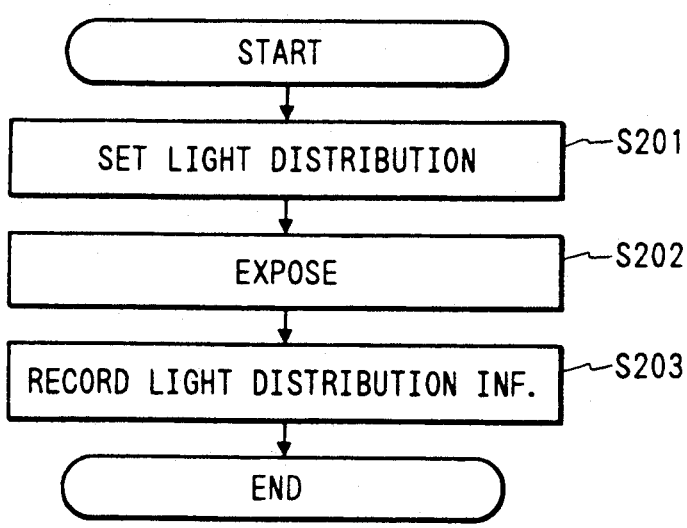
FIGS. 16A and 16B are flow charts showing the operation of the second embodiment of the present invention.
Figure 16B:
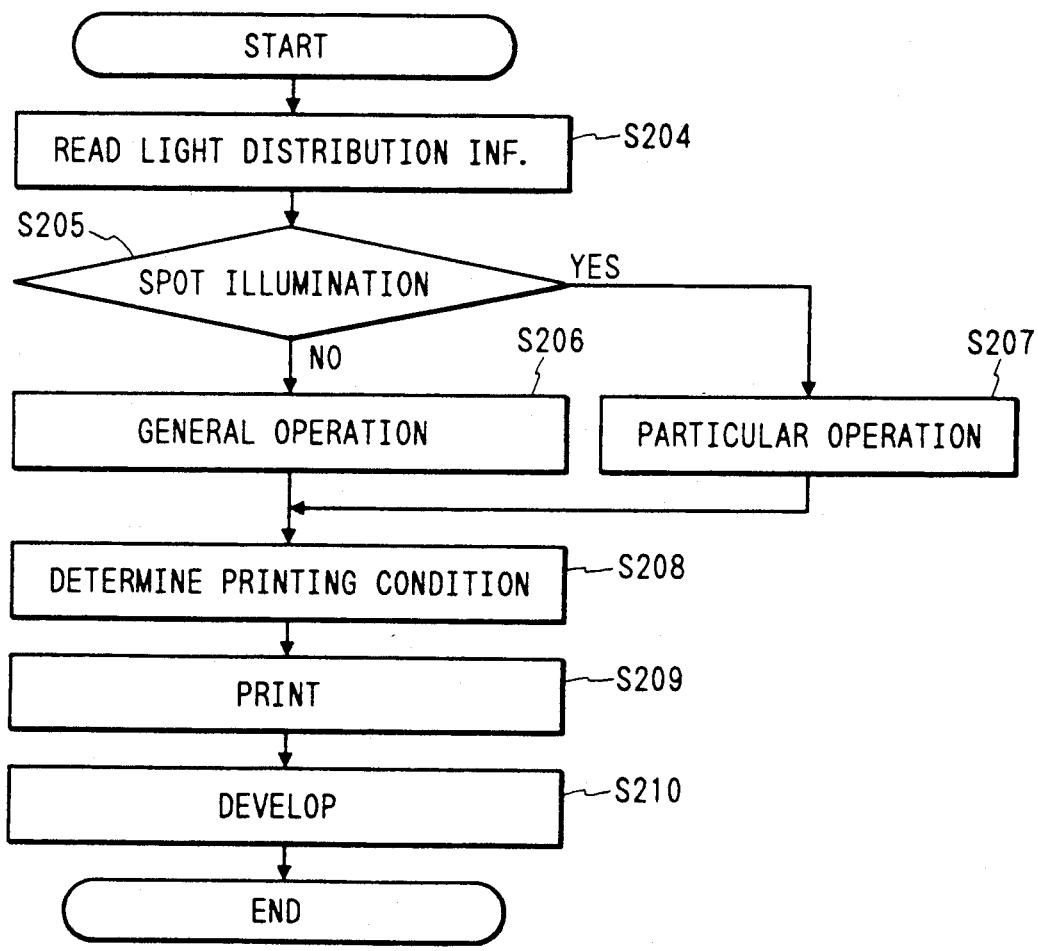

FIG. 16A is a flow chart showing the processing operation of the camera A shown in FIG. 12A, and FIG. 16B shows a flow chart of the operation of the autoprinter B of FIG. 12B.

First, in the camera operation of FIG. 16A, the setting of the light distribution range is effected at a step S201. As previously noted, the ordinary stroboscopic photographing mode is set by lowering the light distribution characteristic converting member 124 downwardly as shown in FIG. 13A, and the spot illumination photographing mode is set by elevating the light distribution characteristic converting member 124 upwardly as shown in FIG. 15A, and these set states can be detected by the switch SW3.

When at a step S202, the photographing operation is performed, (that is, the release operation is performed) and the ordinary flash photographing mode is set, application of light is effected so that the light may be uniform over the whole picture plane. Alternatively, when the spot illumination photographing mode is set, light is applied preponderantly to the spot-illuminated rang and little or no stroboscopic light is applied to the other portions than this range. Of course, when the flash photographing mode is not selected, photographing is effected without flash light emission being effected.

Subsequently, at a step S203, light distribution information indicative of to what range the stroboscopic light has been preponderantly applied is recorded on the film or the film cartridge, and the process is terminated.

Description will now be made of the processing by the autoprinter (in the lab) of FIG. 16B.

First, at a step S204, light distribution information optically recorded on exposed film or light distribution information recorded on a magnetic tape or the like in the film magazine is read. At the next step S205, whether the indicated photographing mode is the spot illumination photographing mode is judged. This judgment may be done by the use of light distribution information indicative of the range to which light is applied.

In the case of the ordinary flash photographing mode in which light is applied to the whole picture plane, or in a case where flash photographing is not being effected, advance is made to the general operation of a step S206, where the measurement of the density of negative and the measurement of color tone are effected for the whole picture surface of the negative.

On the other hand, if at the step S205, the spot illumination photographing mode is discriminated, advance is made to the particular operation of a step S207, where the measurement of the density of the negative and the measurement of color tone are effected for the range of the negative which has been spot-illuminated.

When the measurement of the negative at the step S206 or S207 is complete, at a step S208, the printing conditions are determined from the measured density and color tone of the negative. Subsequently, at a step S209, printing is effected on printing paper, and at a step S210, the printing paper is developed and the process is terminated.

Description will now be made of an improved example of the second embodiment of the present invention directed to a camera endowed with the trimming mode setting function.

Figure 17A:
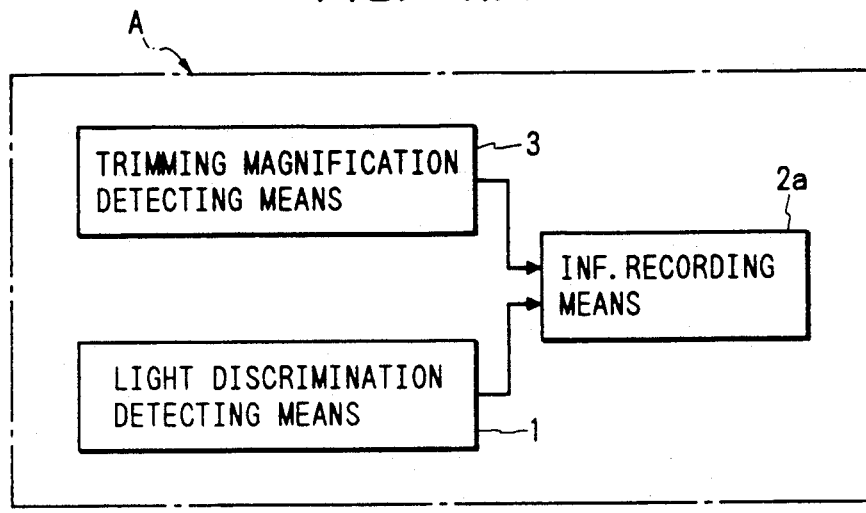
FIGS. 17A and 17B are block diagrams of a modification of the second embodiment of the present invention.

Referring to FIG. 17A which shows the construction of an embodiment of a camera having the trimming mode setting function, the camera A is provided with trimming magnification detecting means 3 for determining the trimming area, in addition to the light distribution characteristic detecting means 1 shown in FIG. 12A, and information recording means 2a having the same function as that of the light distribution information recording means 2.

The trimming magnification detecting means 3 has the function of determining the trimming area indicative of an area to be enlarged and printed during printing when the trimming mode is set. Specifically, it is provided with a viewfinder optical system having the size of its field of view changeable as disclosed, for example, in Japanese Laid-Open Patent Application No. 54-26721, and means operatively associated with this viewfinder optical system to record on film or the like information indicating the range of trimming corresponding to the size of the field of view.

Such trimming magnification detecting means detects as trimming information a trimming magnification T for the whole range of picture plane during the setting of the trimming mode. This trimming magnification T is such that printing of the negative is effected with the negative being enlarged by T times the ordinary enlargement magnification in the lab, so that there can be obtained a photograph having a telephoto effect equal to that when photographing is effected by a lens of a focal length T times as long as the focal length of the lens used during photographing.

The information recording means 2a records the light distribution characteristic detected by the light distribution characteristic detecting means 1 and the trimming magnification T detected by the trimming magnification detecting means 3 on film or a magnetic tape or a semiconductor memory provided in a film magazine. Of course, if the setting is only of the spot illumination photographing mode, the information recording means 2a will record the information detected by the light distribution characteristic detecting means 1, and if the setting is only of the trimming mode, the information recording means 2a will record only the trimming magnification.

Figure 17B:
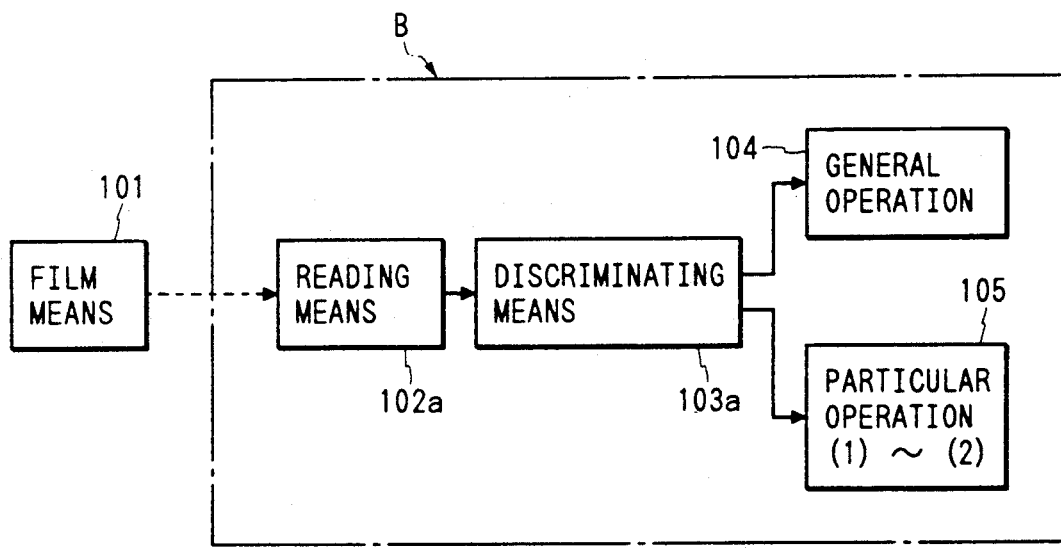

An autoprinter as another embodiment of the present invention having the construction shown in FIG. 17B is provided for film exposed by the camera A of FIG. 17A for recording the light distribution characteristic and the trimming magnification as photographing information.

Referring to FIG. 17B, the autoprinter B is comprised of information reading means 102a, printing process discriminating means 103a, general operation means 104 and particular operation means 105. The trimming magnification and/or the light distribution information recorded on film 101 exposed by the camera A of FIG. 17A is read by the information reading means 102a, and on the basis of the result of this reading, the printing process discriminating means 103a instructs the general operation means 104 to carry out the printing process or instructs the particular operation means 105 to carry out a particular printing process.

Figure 18A:
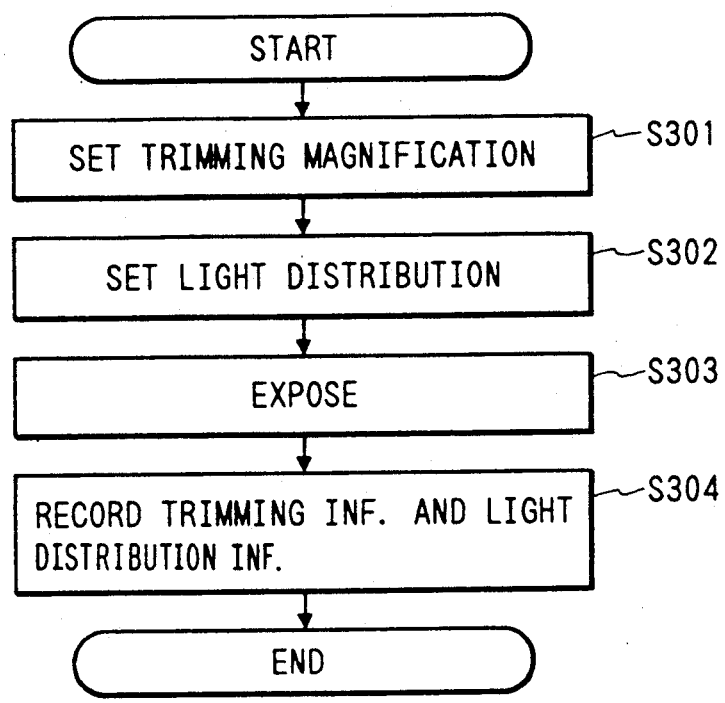

FIG. 18A is a flow chart showing the operation of the camera A shown in FIG. 17A.

In FIG. 18A, first at a step S301, a trimming magnification desired by the photographer is set by the setting of the trimming photographing mode, and at a step S302, the light distribution range of one of the ordinary flash photographing mode or the spot illumination photographing mode is set. Subsequently, at a step S303, the photographing operation is effected, and at a step S304, the trimming information, i.e., the trimming magnification and/or the light distribution information, is recorded.

FIG. 18B is a flow chart showing the processing operation of the autoprinter B shown in FIG. 17B.

In FIG. 18B, first at a step S305, the photographing information, i.e., the trimming information and the light distribution information, are read from the exposed film or the film magazine. Subsequently, at a step S306, whether trimming photographing has been effected is discriminated, and if trimming photographing has not been effected, advance is made to a step S307, where whether spot illumination photographing has been effected is discriminated. If at the step S307, it is judged that spot illumination photographing has not been effected, advance is made to a step S308, where the measurement of density and the measurement of color tone are effected for the whole picture surface of the negative.

On the other hand, if at the step S307, it is judged that spot illumination photographing has been effected, advance is made to a step S312, where the measurement of density and the measurement of color tone are effected for only the spot illumination range of the central portion of the picture surface of the negative.

Also, if at the step S306, it is judged that trimming photographing has been effected, advance is made to a step S309, where whether spot illumination photographing has been effected is judged.

If at the step S309, it is judged that spot illumination photographing has been effected, that is, when both of trimming photographing and spot illumination photographing have been effected at the same time, advance is made to a step S311. When spot illumination photographing has not been effected, that is, when only trimming photographing has been effected, advance is made to a step S310.

At the step S311 when both of trimming photographing and spot illumination photographing have been effected, the sizes of the spot illumination range and the trimming range are compared with each other. When the spot illumination range is wider than the trimming range, advance is made to a step S310, where the measurement of density and the measurement of color tone are effected with respect to all area of the trimming range which is narrower. On the other hand, if at the step S311, the spot illumination range is narrower than the trimming range, advance is made to a step S312, where the measurement of density and the measurement of color tone are effected with respect to the spot illumination range which is narrower.

When the measurement of the density and color tone of the negative is terminated at one of the steps S308, S310 and S312, advance is made to a step S313, where the printing conditions, i.e., the quantity of printing light and the amount of color correction, are determined and printing is effected. Finally at a step S314, development is effected and the printing process is then terminated.

At the steps S310 and S312 of FIG. 18B, the measurement of density and the measurement of color tone are effected with respect to only a particular range of the whole picture surface of the negative. For such partial measurement of the picture surface, for example, a plurality of light receiving elements may be disposed so as to divide the picture plane, and utilization may be made of the output of a light receiving element corresponding to the necessary picture plane range.

Also, in the above-described embodiment, the measurement range of the negative is discriminated by the autoprinter in the lab on the basis of the light distribution information or the trimming information and a decision is then made as between general operation and particular operation. Alternatively, whether the light distribution information and/or the trimming information dictate use of the general operation or the particular operation during printing may be discriminated by the camera and the discrimination information may be recorded on the film or the film magazine.

A third embodiment of the present invention will now be described.

Figure 19:
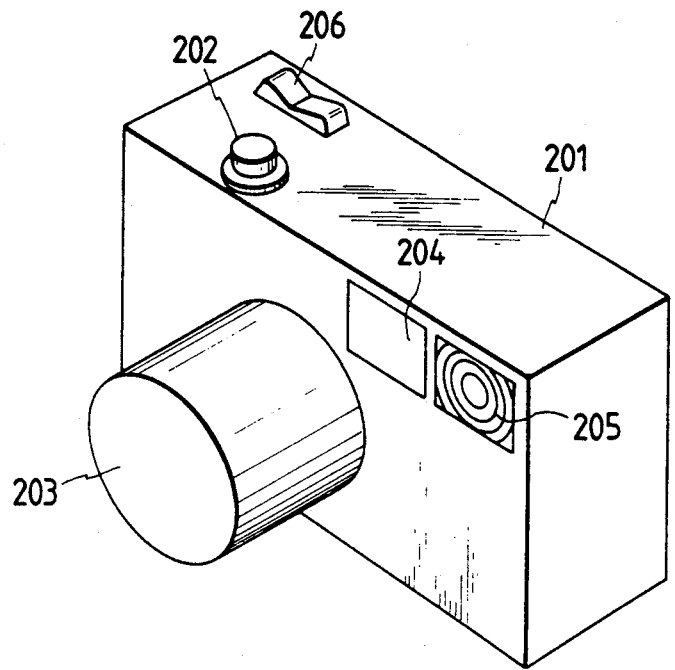
FIG. 19 shows the external appearance of a third embodiment of the present invention.

FIG. 19 is a perspective view of a camera 201 according to the present invention which is capable of trimming photographing. Referring to FIG. 19, a zoom lens barrel 203 is provided on the front face of the body of the camera, and a viewfinder 204 for changing the magnification in response to the zooming operation and the light emitting portion 205 of an electrical flash device are provided on the right upper portion of the front face. A shutter button 202 and a zoom operating member 206 for driving the zoom lens are provided on the upper surface of the camera body.

Figure 20A:
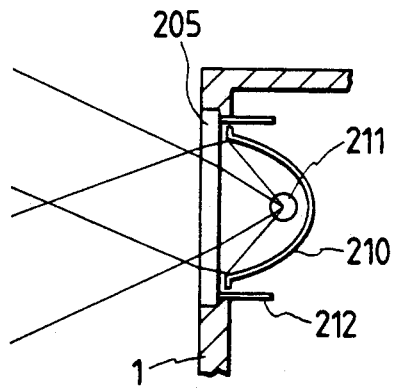
FIGS. 20A and 20B shown the structure and operation of a portion of the third embodiment of the present invention.
Figure 20B:
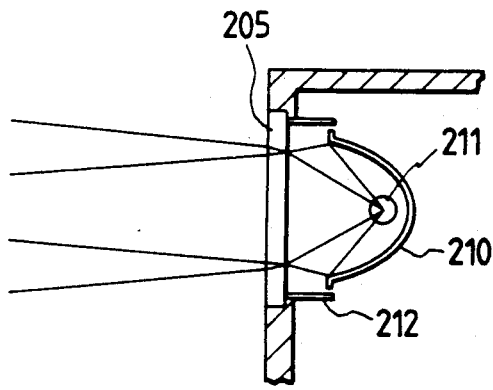

FIGS. 20A and 20B schematically illustrate the operation of the light emitting portion of the camera according to the present invention which is capable of trimming photographing.

Referring to FIGS. 20A and 20B, a reflecting mirror 210 and a light emitting member 211 are provided within the camera 201 for movement in the direction of the optic axis. A light emitted from the light emitting member 211 may be reflected by the reflecting mirror 210 and applied to the outside through a condensing lens 205. In this case, in the state shown in FIG. 20A, the reflecting mirror 210 and the light emitting member 211 are proximate to the condensing lens 205 and wide range illumination of an object to be photographed is possible. Also, in the state shown in FIG. 20B, the reflecting mirror 210 and the light emitting member 211 are spaced apart from the condensing lens 205 so that only a narrow range of the object to be photographed may be illuminated. Accordingly, the state shown in FIG. 20A is a state suitable for wide angle photographing, and the state shown in FIG. 20B is a state suitable for telephoto photographing or trimming photographing.

Figure 24:
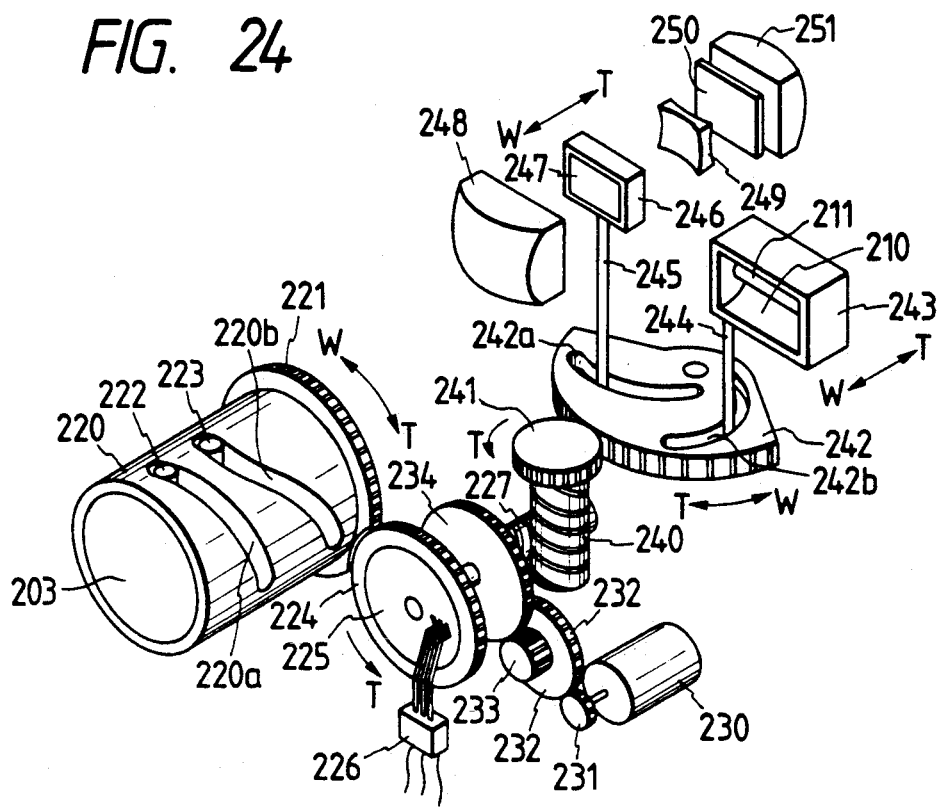
FIGS. 24, 25 and 26 show portions of the construction of the third embodiment of the present invention.

FIG. 24 is a view showing chiefly an operating member with the external portion of the camera of FIG. 19 removed.

Referring to FIG. 24, a drive motor 230 is connected for power transmission to a gear 224 through reduction gears 231, 232, 233 and 234. The gear 234 is connected to a cut-away gear 221 in such a manner as will be described later with reference to FIGS. 25 and 26. A printed plate 225 for encoder is attached to a side of the gear 224, and a brush member 226 bears against the printed plate 225. The zoom lens barrel 203 comprises the cut-away gear 221 and a cylindrical cam ring 220 coaxially connected thereto. Cam slots 220a and 220b are formed in the peripheral portion of the cam ring 220, and the pins 222 and 223 of a lens group holding member are engaged with these cam slots, respectively.

As the drive motor 230 rotates, the cut-away gear 221 is rotated through the reduction gears and the gear 224. The rotation of the cut-away gear 221 causes the rotation of the cam ring 220, whereby the pins 222 and 223 are moved along the cam slots 220a and 220b, respectively, to thereby move a lens group, not shown, in the direction of the optic axis, so that the zooming operation may be performed only within a range in which zooming is possible. Also, design is made such that an encoder comprising the printed plate 225 and the brush member 226 can output a signal conforming to the rotation of the gear 224.

The above-described reduction gear 234 has a screw gear 227 coaxially mounted thereon, and this screw gear 227 is in meshing engagement at a right angle with another screw gear 240 having a gear 241 coaxially mounted thereon. The gear 241 is in meshing engagement with a sector gear 242 having cam slots 242a and 242b formed in the upper surface thereof. One end of a viewfinder driving rod 245 movable only in the direction of the optic axis is engaged with the cam slot 242a, and the other end thereof is mounted on a holder 246 for holding a magnification changing lens 247. An Albada type zoom lens finder comprises this magnification changing lens 247, an objective lens 248, an Albada lens 249, frame-evaporated glass 250 and an eyepiece finder 251.

Also, one end of a driving rod 244 movable only in the direction of the optic axis is engaged with the cam slot 242b, and the other end thereof is connected to a holding member 243 for holding the light emitting portion 211.

The rotation of the drive motor 230 rotates the sector gear 242 through the reduction gears and other gears, and the rotation of the sector gear 242 moves the finder driving rod 245 and a stroboscopic lamp driving rod 244 along the cam slots 242a and 242b, respectively, thereby moving the light emitting portion 211 and the magnification changing lens 247 in the direction of the optic axis.

Figure 25:
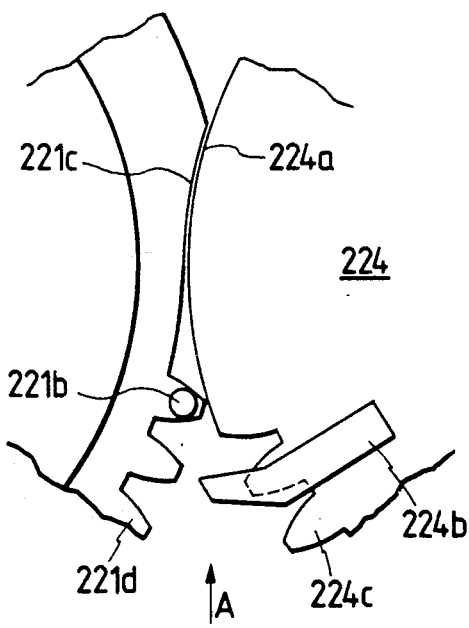
Figure 26:
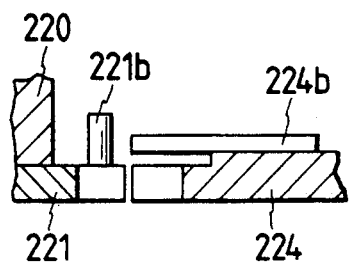

FIG. 25 is an enlarged view showing only the front portion of engagement between the gear 224 and the cut-away gear 221, and FIG. 26 is a view of the portion of engagement shown in FIG. 25 as it is seen in the direction of arrow A in FIG. 25.

Referring to FIGS. 25 and 26, the gear 224 is formed with a row of teeth 224c only on a portion of the circumference thereof. A pawl portion 224b is provided at one end of the row of teeth 224c so as to protrude radially outwardly. The cut-away gear 221 is also formed with a row of teeth 221d only on a portion of the circumference thereof. A pin 221b is studded on the tooth at one end of the row of teeth 221d. Further, a cut-away portion 221c shaped along the circumference of the gear 224 is provided near the row of teeth 221d of the cut-away gear 221.

The operations of the thus constructed curaway gear 221 and gear 224 will hereinafter be described.

The power transmitted from the drive motor 230 through the reduction gears rotates the gear 224. When the zoom lens barrel 203 is in the zoom-possible range between the wide angle position (W) and the telephoto position (T), the row of teeth 224c of the gear 224 is in meshing engagement with the row of teeth 221d of the cut-away gear 221. Therefore, the power transmission from the gear 224 to the cut-away gear 221 is effected normally, and the zoom lens barrel 203 effects the zooming operation in accordance with the transmitted power.

When the gear 224 is further rotated in the same direction (the counterclockwise direction) even after the zoom lens barrel 203 assumes the telephoto position (T), the row of teeth 224c of the gear 224 becomes disengaged from the row of teeth 221d of the cut-away gear 221 and further, the circumference of the gear 224 is received in the cut-away portion 221c of the cut-away gear 221 and the gear 224 no longer transmits the rotation to the cut-away gear 221. When the gear 224 is further rotated clockwise from the above-described state, the pawl portion 224b of the gear 224 bears against the pin 221b of the cut-away gear 221, whereby the rows of teeth 224c and 221d begin to mesh with each other again.

Description will now be made of the operation of the camera capable of trimming photographing which is constructed as described above.

When the photographer pushes the zoom operating member 206 of FIG. 19 with his finger from the wide angle position toward the telephoto position, the drive motor 230 is rotated to zoom-operate the zoom lens barrel 203 and at the same time, move the light emitting portion 211 and the finder 247. The photographer, while looking into the finder, releases his finger from the zoom operating member 206 when the desired size of the object to be photographed (the desired photographing magnification) is reached. Thereby the drive motor 230 is stopped, and the zooming operation and the movement of the light emitting portion and the finder are also stopped. By simply depressing a shutter button thereafter, the photographer can accomplish photographing at an appropriate magnification.

When the photographer wants to make the photographing magnification greater than that obtained at the maximum telephoto position of the zoom lens barrel 203, the photographer continues to depress the zoom operating member 206, and the drive motor 230 further continues to rotate even when the zoom lens barrel 203 has assumed the telephoto position. In this case, the zoom lens barrel 203 is caused to remain in the telephoto position by the mechanism shown in FIG. 25, but the light emitting portion 211 and the finder 247 further continue to move for the purpose of trimming photographing. If by confirmation through the finder, it is found that the desired photographing magnification has been reached, the photographer releases his finger from the zoom operating member 206, whereby the light emitting portion 211 and the finder 247 are stopped and the flash device assumes an illuminating angle for appropriately illuminating that portion of the object which is to be trimming-photographed. The positions of the light emitting portion 211 and the finder 247 in this state can be read as trimming information by an encoder mechanism comprising the printed plate 225 and the brush member 226, and can be recorded, for example, on the negative film by trimming information input means for use as data during development. The output of the encoder mechanism comprising the printed plate 225 and the brush member 226 can of course be used also as zooming information in the zoom range.

When it is desired to effect photographing at the wide angle position of the zoom lens from this state, the photographer pushes the zoom operating member toward the wide angle position. Thereby, the drive motor 230 is rotated in the opposite direction to move the light emitting portion 211 and the finder 247 in the opposite direction, and when they return to the telephoto position, the zoom lens barrel 203 also starts to move. Accordingly, the photographer can depress the shutter button simply upon operating the zoom operating member while looking into the finder and without being conscious of zoom photographing or trimming photographing.

Figure 21A:
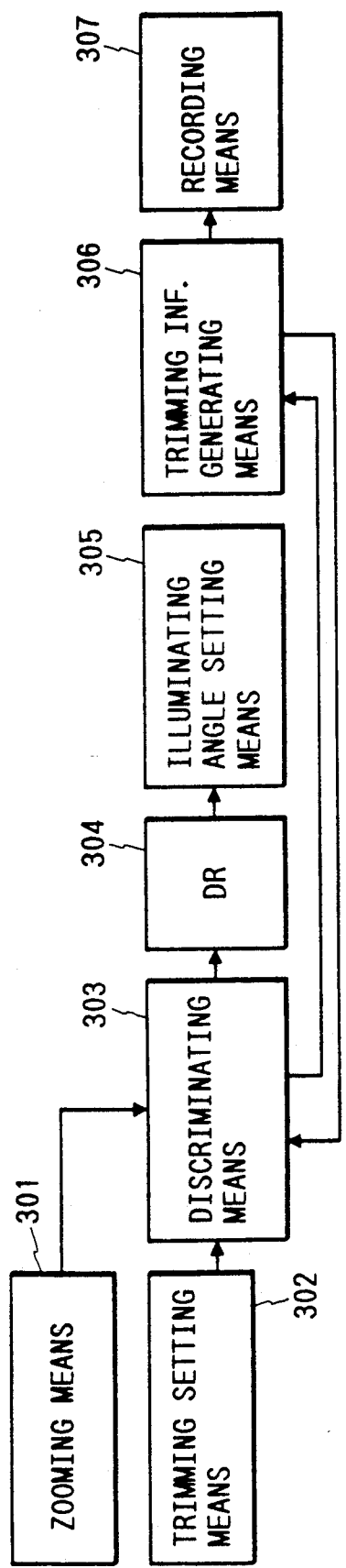
FIG. 21A is a block diagram of the third embodiment of the present invention.
Figure 21B:
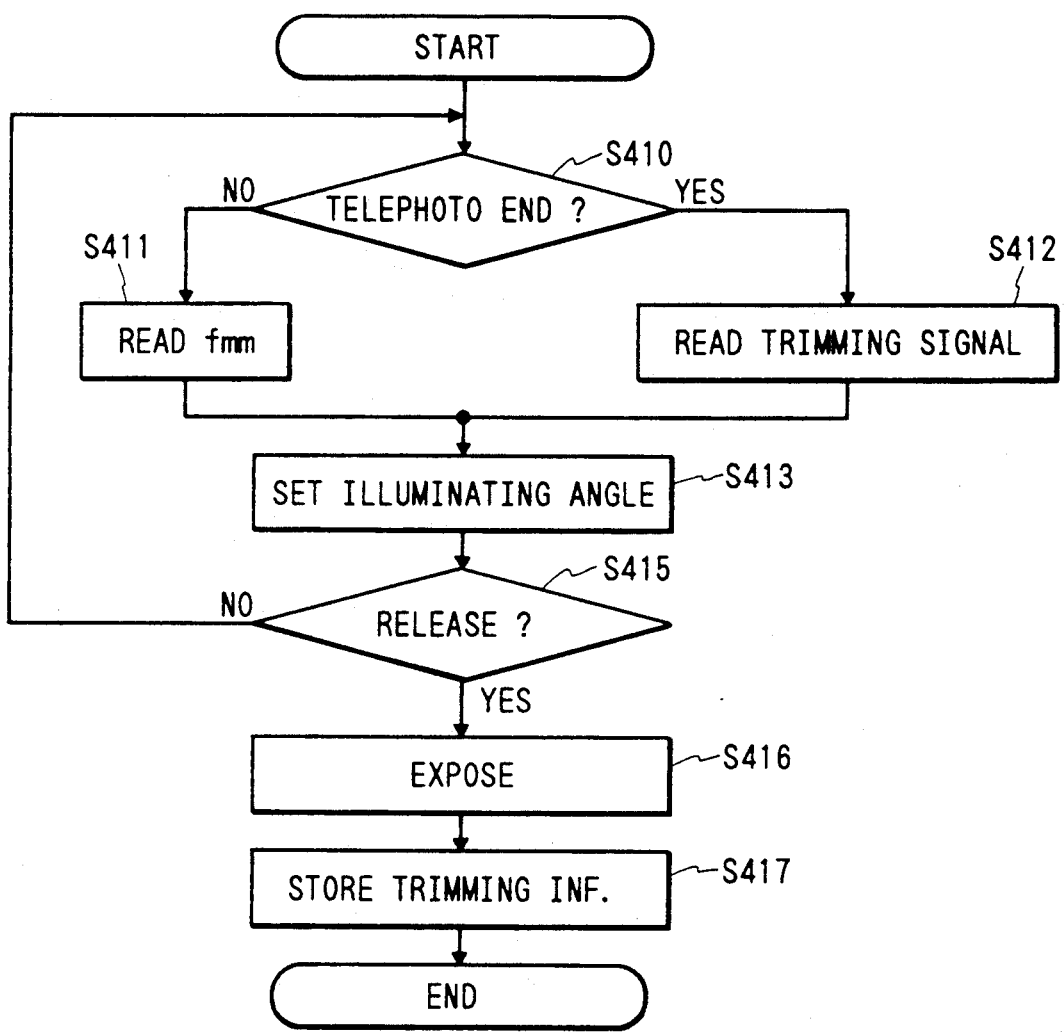
FIG. 21B is a flow chart showing the operation of the FIG. 21A embodiment.

FIG. 21A shows a modification of the third embodiment of the present invention, and is a block diagram of a camera capable of both zoom photographing and trimming photographing by manual operation. The operation of the camera of FIG. 21A will hereinafter be described with reference to FIG. 21B.

In FIG. 21A, a focal length signal is sent from optical zoom means 301 to a discriminating circuit 303. Also, a trimming signal indicative of trimming information is sent from trimming setting means 302 to the discriminating circuit 303. The discriminating circuit 303, at a step S410, discriminates whether the zoom lens is at a position from the wide angle position to the telephoto position, for example, in response to the half depression of the shutter button. If the lens is not at the telephoto end, the focal length signal is read at a step S411, and at step S413, a driving signal is sent to an illuminating angle setting driving circuit 304 to thereby drive illuminating angle setting means 305 so as to set the illuminating angle of the electrical flash device according to the focal length of the zoom lens. When at a step S415, the release of the shutter is detected, the exposing operation is performed at a step S416. In this case, trimming information (corresponding to the field angle information in the first embodiment) is not recorded.

When it is judged at the step S410 that the zoom lens is in the telephoto position, at a step S412, the trimming signal is read. At a step S413, the discriminating circuit 303 sends a driving signal to the illuminating angle setting driving circuit 304 to operate the setting means 305 so as to set the illuminating angle of flash light emission according to the amount of trimming. Memory means is contained in trimming information generating means 306, and the trimming signal passed through the discriminating circuit 303 is stored in this memory means. Trimming information to recording means 307 is designed to record trimming information corresponding to the position of the light emitting portion on negative film or the like. The trimming information in the trimming information generating means 306 is adapted to be fed back also to the discriminating circuit 303, and the design is made such that if said trimming information indicates an amount of trimming differing from the trimming signal sent by the discriminating circuit 303, a correction signal, an alarm or the like is output.

Figure 22A:
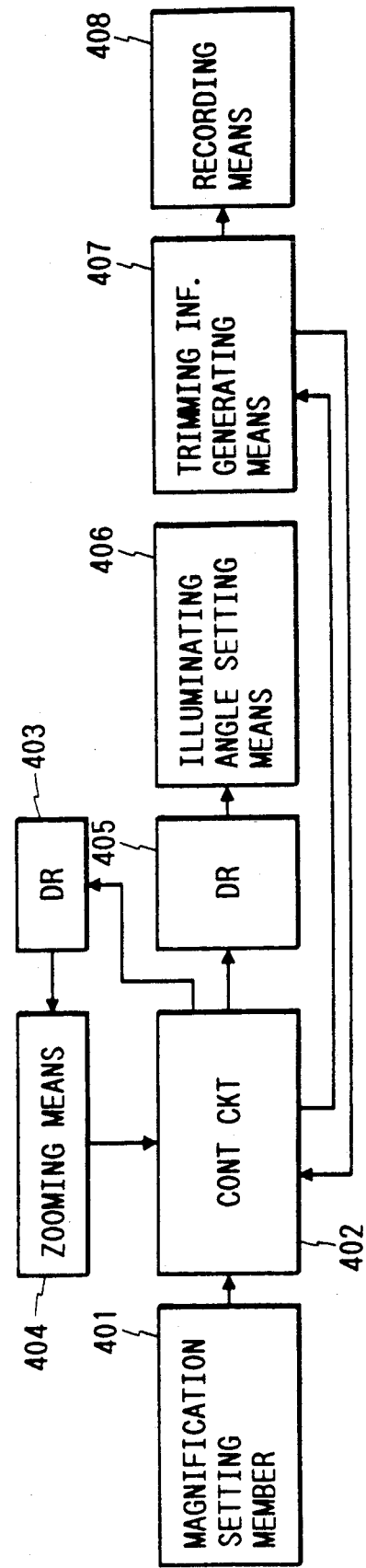
FIG. 22A is a block diagram of a modification of the third embodiment of the present invention.
Figure 22B:
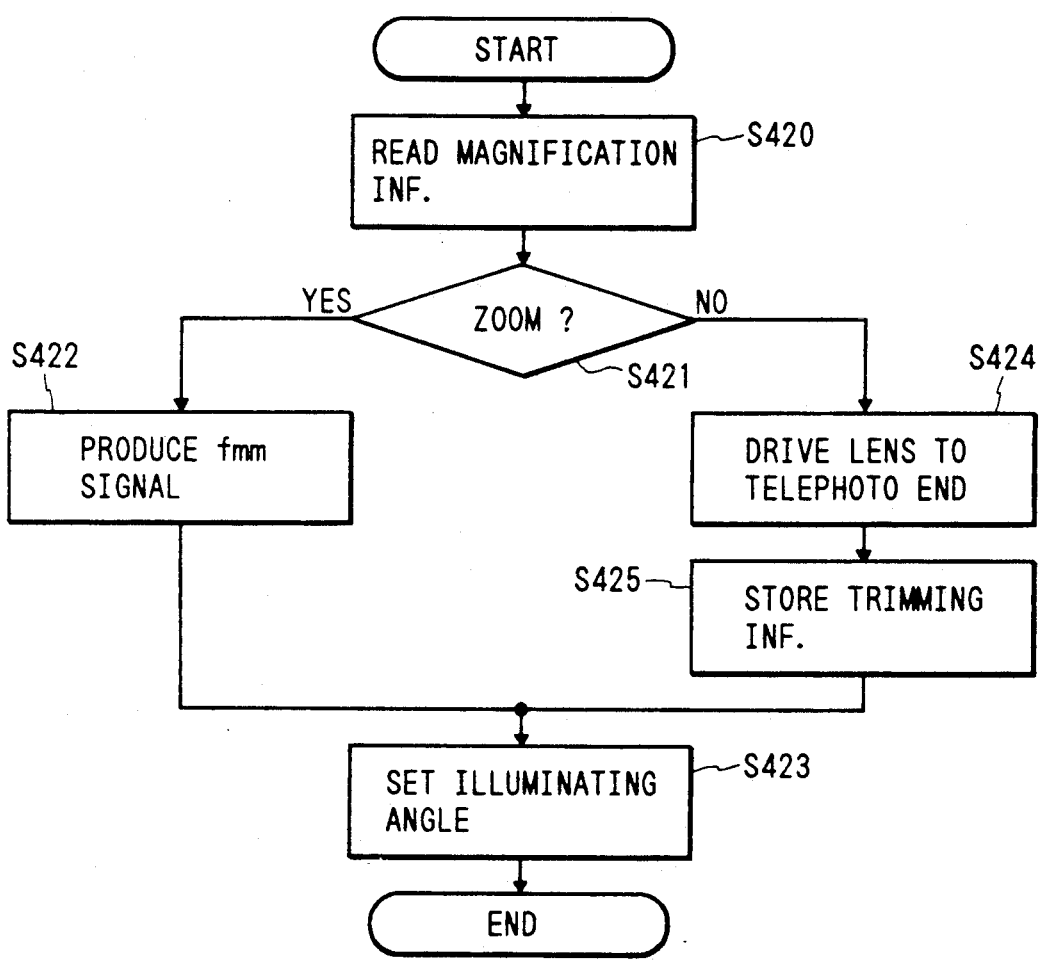
FIG. 22B is a flow chart showing the operation of the FIG. 22A modification.

FIG. 22A shows another modification of the third embodiment of the present invention, and is a block diagram of a camera capable of automatically shifting from zoom photographing to trimming photographing simply by setting the photographing magnification. The operation of the camera of FIG. 22A will hereinafter be described with reference to the flow chart of FIG. 22B.

In FIG. 22A, a photographing magnification signal is sent to a control circuit 402 by a magnification setting member 401 capable of setting any photographing magnification. At a step S420, the control circuit 402 reads the photographing magnification signal. At a step S421, whether the photographing magnification indicated by the photographing magnification signal is within the zoom range of the zoom lens is judged. If the magnification is judged to be within the zoom range, at a step S422, a focal length signal corresponding to the photographing magnification is made and sent to a zoom driving circuit 403, and the zooming operation is performed by electric zooming means 404. The electric zooming means 404 generates a zoom position signal and sends it to the control circuit 402. The control circuit 402 controls the two signals so that they may coincide with each other. Also, at a step S423, the control circuit 402 sends a driving signal to an illuminating angle setting driving circuit 405 to thereby operate illuminating angle setting means 406 so as to set the illuminating angle of flash light emission according to the focal length of the zoom lens. In this case, a position signal is not sent from the illuminating angle setting means 405 to trimming information generating means 407 and therefore, the trimming information is not recorded.

If at the step S421, the control circuit 402 judges on the basis of the input photographing magnification signal that the desired photographing magnification exceeds the zoom range of the zoom lens and trimming photographing is necessary, at a step S424, a forced telephoto position setting signal is sent to the zoom driving circuit 403 and the zoom lens is forcibly moved to the telephoto position. At a step S425, the trimming information is stored in a memory contained in the generating means 407. At the step S423, the control circuit 402 sends a driving signal to the setting driving circuit 405 to operate the illuminating angle setting means 406 so as to set the illuminating angle of flash light emission according to the amount of trimming based on the photographing magnification.

Figure 23:
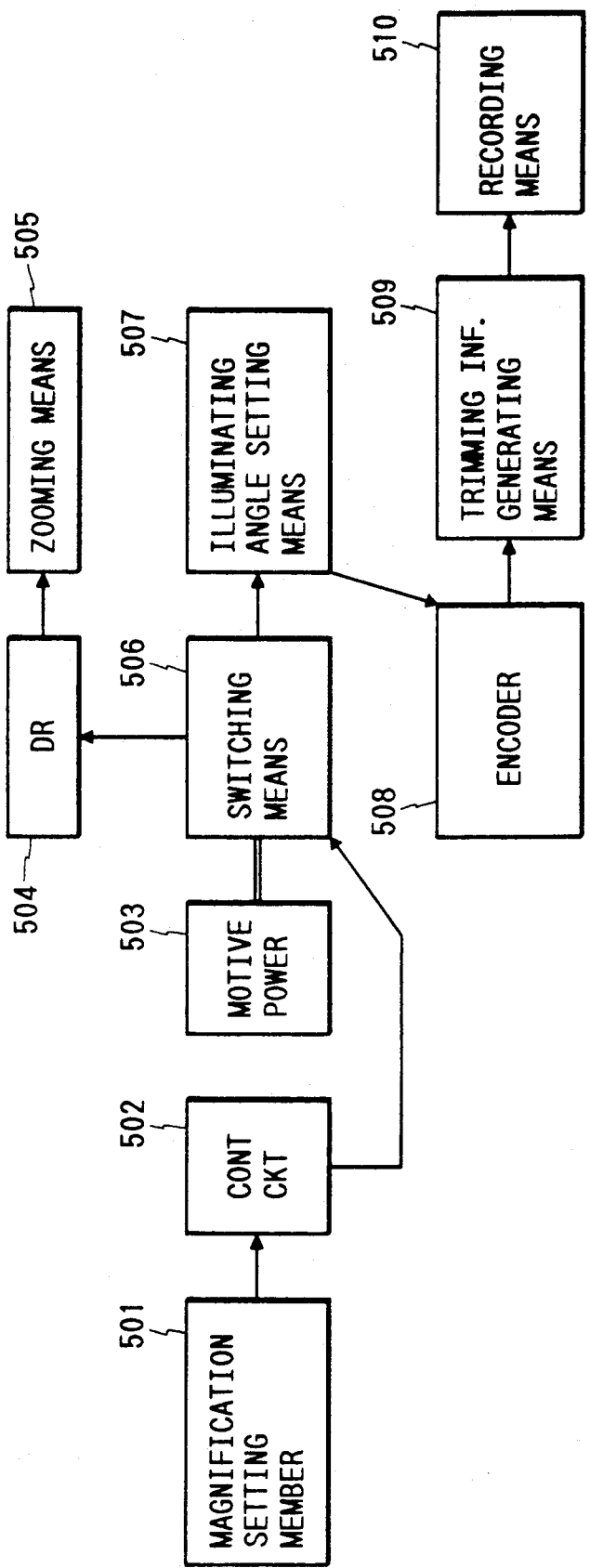
FIG. 23 is a block diagram of another modification of the third embodiment of the present invention.

FIG. 23 shows another modification of the third embodiment of the present invention, and is a block diagram of camera using a single power transmission means.

In FIG. 23, a photographing magnification signal sent from a magnification setting member 501 to a control circuit 502 is judged in the same manner as in the embodiment shown in FIG. 22, and a control signal is sent to power transmission switching means 506 power-connected to a single motive power means 503. The power transmission switching means 506 selectively transmits the motive power from the motive power means 503 to one of optical zoom driving means 504 for driving optical zooming means 505 and illuminating angle setting means 507 on the basis of said control signal. Thus, in the modification of FIG. 23, the illuminating angle of the light emitting portion does not vary in response to the zooming operation of the optical zooming means 505. When the motive power is transmitted to illuminating angle setting means 507, an encoder 508 is operated at the same time, and the encoder 508 sends a stroboscopic lamp position signal to trimming information generating means 509. The trimming information generating means 509 generates trimming information on the basis of this signal and sends it to trimming information recording means 510. The trimming information recording means 510 is adapted to record trimming information corresponding to the stroboscopic lamp position on negative film or the like.

We claim:

1. A camera capable of photographing with the aid of the application of light to an object to be photographed by electrical flash means, said camera including:
   producing means for producing field angle information regarding the photographing field angle;
   detecting means for detecting that the photographing field angle is wider than the illuminating angle of the light of said electrical flash means and outputting a detection signal; and
   control means responsive to said detection signal to cause said producing means to produce field angle information indicative of a photographing field angle narrower than the illuminating angle of the light of said electrical flash means.

2. A camera according to claim 1, wherein said producing means produces said field angle information on the basis of the focal length of a photo-taking lens.

3. A camera according to claim 2, further including adjusting means responsive to said detection signal to adjust the focal length of the photo-taking lens in the direction of a longer focal length.

4. A camera according to claim 3, further including means for detecting and warning that said photo-taking lens has assumed the longest focal length.

5. A camera according to claim 1, wherein said producing means produces said field angle information on the basis of a trimming magnification.

6. A camera according to claim 5, further including means for recording said field angle information on film means inserted into said camera and having film and a cartridge.

7. A camera having recording means for recording photographing information on film means having film and a cartridge, said camera including:
   flash light emission control means capable of selecting a first mode in which light is substantially uniformly applied to the whole of the photographing area and a second mode in which light is applied so that the light applied to a part of the photographing area may be more intense than the light applied to the remaining area; and
   recording control means for causing said recording means to record information indicated by said part of the photographing area on said film means when said flash light emission control means selects said second mode.

8. A camera capable of being loaded with film means having film and a cartridge and capable of recording photographing information, said camera including:

producing means for producing trimming information regarding trimming to be performed when printing is effected from developed film onto printing paper, and recording said trimming information on said loaded film means;

electrical flash means for emitting flash light toward an object to be photographed;

flash emission adjusting means for adjusting the illuminating angle of the flash light of said electrical flash means; and control means for causing said flash emission adjusting means to adjust the illuminating angle of the flash light of said electrical flash means on the basis of said trimming information.

9. A camera according to claim 8, further including focal length adjusting means for adjusting the focal length of a photo-taking lens and wherein said producing means does not effect the recording of trimming information except when said photo-taking lens is positioned at the longest focal length.

10. A camera capable of being loaded with film means having film and a cartridge and capable of recording photographing information, said camera including:

operating means for being operated by an operator;

a photo-taking lens having a focal length adjustable in a first predetermined range;

focal length adjusting means for adjusting the focal length of said photo-taking lens;

flash means;

illuminating angle adjusting means for adjusting an illuminating angle of said flash means in a second predetermined range including angles corresponding to focal lengths within and outside of said first predetermined range;

a driving source for driving said focal length adjusting means and said illuminating angle adjusting means;

control means responsive to the operation of said operating means for connecting said driving source with said focal length adjusting means and said illuminating angle adjusting means to adjust the focal length of said photo-taking lens and the illuminating angle of said flash means, said control means disconnecting said driving source from said focal length adjusting means to fix the focal length of said photo-taking lens at an end of said first predetermined range when the illuminating angle of said flash means is adjusted to an angle corresponding to a focal length outside of said first predetermined range; and recording means responsive to the operation of said operating means for producing trimming information regarding trimming to be effected upon printing, when the illuminating angle of said flash means corresponds to a focal length outside of said first predetermined range, and for recording said trimming information on said loaded film means.

11. A camera according to claim 10, wherein said end of said first predetermined range corresponds to a telephoto end of said photo-taking lens and said second predetermined range includes angles corresponding to focal lengths above said first predetermined range.

12. A camera capable of being loaded with film means having film and a cartridge and capable of recording photographing information, said camera including:

means for producing a photographing magnification signal indicative of a desired photographing magnification;

a photo-taking lens having a focal length adjustable in a predetermined range;

focal length adjusting means for adjusting the focal length of said photo-taking lens;

flash means;

illuminating angle adjusting means for adjusting an illuminating angle of said flash means;

detecting means for detecting that the magnification indicated by said photographing magnification signal is outside of a range of photographing magnification corresponding to said predetermined range, and for producing a detection signal;

control means for controlling said focal length adjusting means and said illuminating angle adjusting means on the basis of said photographing magnification signal, said control means causing said focal length adjusting means to fix the focal length of said photo-taking lens at an end of said predetermined range in response to said detection signal and, in conjunction therewith, causing said illuminating angle adjusting means to adjust the illuminating angle of said flash means on the basis of said photographing magnification signal; and recording means for producing on the basis of said photographing magnification signal trimming information regarding trimming to be effected upon printing, when the magnification indicated by said photographing magnification signal is outside of the range of photographing magnification corresponding to said predetermined range, and for recording said trimming information on said loaded film means.

13. A camera according to claim 12, wherein said detecting means detects if the magnification indicated by said photographing magnification signal corresponds to a focal length above said predetermined range, and said control means causes said focal length adjusting means to fix the focal length of said photo-taking lens at the maximum of said predetermined range.

14. A camera capable of photographing with the aid of the application of light to an object to be photographed by electrical flash means which is capable of mounting to said camera and has illuminating angle information producing means for producing illuminating angle information regarding the illuminating angle of the light of said electrical flash means, said camera including:

field angle information producing means for producing field angle information regarding the photographing field angle;

detecting means for detecting that the photographing field angle is wider than the illuminating angle of the light of said electrical flash means and outputting a detection signal; and control means responsive to said detection signal to cause said field angle information producing means to produce field angle information indicative of a photographing field angle narrower than the illuminating angle of the light of said electrical flash means.

15. A camera according to claim 14, wherein said field angle information producing means produces said field angle information on the basis of the focal length of a photo-taking lens.

16. A camera according to claim 15, further including adjusting means responsive to said detection signal to adjust the focal length of said photo-taking lens in the direction of a longer focal length.

17. A camera according to claim 16, further including means for detecting and warning that said photo-taking lens has assumed the longest focal length.

18. A camera according to claim 17, wherein said field angle information producing means produces said field angle information on the basis of a trimming magnification.

19. A camera according to claim 18, further including means for recording said field angle information on film means inserted into said camera and having film and a cartridge.

20. A camera capable of photographing with the aid of the application of light to an object to be photographed by electrical flash means, said camera including:
   field angle adjusting means for adjusting the photographing field angle;
   stopping means for stopping an adjusting operation of said field angle adjusting means;
   illuminating angle information producing means for producing illuminating angle information regarding the illuminating angle of the light of said electrical flash means; and
   recording means for recording said illuminating angle information on film means inserted into said camera and having film and a cartridge when said stopping means stops the adjusting operation of said field angle adjusting means.

21. A system comprising:
   a camera having recording means for recording photographing information on film means having film and a cartridge, flash light emission control means and recording control means, said flash light emission control means being capable of selecting a first mode in which light is substantially uniformly applied to the whole of a photographing area and a second mode in which light is applied so that the light applied to a part of the photographing area is more intense than the light applied to the remaining area, said recording control means causing said recording means to record information indicated by said part of the photographing area on said film means when said flash light emission control means selects said second mode.

22. A camera according to claim 1, which is attachable to a plurality of photographing lenses selectively, and which further comprises discriminating means for discriminating whether or not the photographing lens attached to said camera has a changeable focal length, and trimming information producing means for producing trimming information and recording trimming information on film means inserted into said camera and having film and a cartridge when said discriminating means discriminates that the focal length of the photographing lens attached to said camera is not changeable.

23. A camera according to claim 1, further comprising means for discriminating whether or not a photographing lens attached to the camera has a focal length which may be adjusted in accordance with a magnification desired by a photographer, and trimming information producing means for producing trimming information and recording trimming information on film means inserted into said camera and having film and a cartridge when said discriminating means discriminates that the focal length cannot be so adjusted.

24. A camera according to claim 14, which is attachable to a plurality of photographing lenses selectively, and which further comprises discriminating means for discriminating whether or not the photographing lens attached to said camera has a changeable focal length, and trimming information producing means for producing trimming information and recording trimming information on film means inserted into said camera and having film and a cartridge when said discriminating means discriminates that the focal length of the photographing lens attached to said camera is not changeable.

25. A camera according to claim 14, further comprising means for discriminating whether or not a photographing lens attached to the camera has a focal length which may be adjusted in accordance with a magnification desired by a photographer, and trimming information producing means for producing trimming information and recording trimming information on film means inserted into said camera and having film and a cartridge when said discriminating means discriminates that the focal length cannot be so adjusted.

26. A camera according to claim 7, further including means for producing trimming information regarding trimming to be performed when printing is effected from the film onto paper, and wherein said recording control means causes said recording means to record the trimming information on said film means.

27. A camera according to claim 8, further comprising means for discriminating whether or not a photographing lens attached to the camera has a focal length which may be adjusted in accordance with a magnification desired by a photographer, and wherein said producing means records said trimming information on said loaded film means when said discriminating means discriminates that the focal length cannot be so adjusted.

28. A camera according to claim 20, further comprising discriminating means for determining whether or not a photographing lens attached to the camera has a focal length which may be adjusted in accordance with a magnification desired by a photographer, and producing means for producing trimming information, and wherein said recording means records trimming information produced by said producing means on said film means with said illuminating angle information when said discriminating means discriminates that the focal length cannot be so adjusted.

29. A system according to claim 21, wherein said camera has means for producing trimming information regarding trimming to be performed when printing is effected from the film onto paper, and wherein said recording control means causes said recording means to record the trimming information on said film means.

* * * * *